US009522642B2

(12) United States Patent
Ishikawa et al.

(10) Patent No.: US 9,522,642 B2
(45) Date of Patent: Dec. 20, 2016

(54) OIL SUPPLY DEVICE

(71) Applicant: AISIN AW CO., LTD., Anjo-shi, Aichi-ken (JP)

(72) Inventors: Tomomi Ishikawa, Anjo (JP); Kazuhito Enomoto, Kariya (JP); Kazuyuki Noda, Handa (JP); Satoshi Nishio, Nukata (JP); Keiji Suzuki, Anjo (JP)

(73) Assignee: AISIN AW CO., LTD., Anjo-shi (JP)

( * ) Notice: Subject to any disclaimer, the term of this patent is extended or adjusted under 35 U.S.C. 154(b) by 0 days.

(21) Appl. No.: 14/765,184

(22) PCT Filed: Mar. 28, 2014

(86) PCT No.: PCT/JP2014/059333
§ 371 (c)(1),
(2) Date: Jul. 31, 2015

(87) PCT Pub. No.: WO2014/157689
PCT Pub. Date: Oct. 2, 2014

(65) Prior Publication Data
US 2015/0367793 A1    Dec. 24, 2015

(30) Foreign Application Priority Data

Mar. 29, 2013  (JP) ................................. 2013-074835

(51) Int. Cl.
*B60R 17/02*     (2006.01)
*B60K 6/48*      (2007.10)
(Continued)

(52) U.S. Cl.
CPC ................. *B60R 17/02* (2013.01); *B60K 6/48* (2013.01); *B60K 6/54* (2013.01); *B60K 6/543* (2013.01);
(Continued)

(58) Field of Classification Search
CPC ........... B60R 17/00; B60R 17/02; B60K 6/48; B60K 6/54; B60K 6/543; B60K 6/547; B60L 1/003; B60L 11/14; B60L 15/20; B60L 15/2054; B60W 10/30; B60W 20/00; F16H 61/0021; F16H 61/0031; F16H 2061/0037; F16H 61/0037
(Continued)

(56) References Cited

U.S. PATENT DOCUMENTS 6,769,502 B2 *   8/2004  Nakamori .............. B60K 6/365
                                                        180/65.25
8,308,595 B2 *  11/2012  Noda .................... B60L 3/0023
                                                        475/116
(Continued)

FOREIGN PATENT DOCUMENTS

DE   10 2009 042 933 A1   5/2010
EP        1 223 365 A2    7/2002
(Continued)

OTHER PUBLICATIONS

May 3, 2016 Search Report issued in European Patent Application No. 14775339.6.
(Continued)

*Primary Examiner* — John Walters
(74) *Attorney, Agent, or Firm* — Oliff PLC

(57) ABSTRACT

An oil supply device that supplies oil to a vehicle drive device that includes an input member drivably coupled to an internal combustion engine, a rotary electric machine for driving wheels, an output member drivably coupled to the wheels, a speed change device that includes a shifting engagement device and that at least transfers rotation of the input member to the output member with the speed of the
(Continued)

rotation changed, and a decoupling engagement device that decouples the input member from the speed change device.

19 Claims, 6 Drawing Sheets

(51) Int. Cl.
| | |
|---|---|
| *B60K 6/547* | (2007.10) |
| *B60L 11/14* | (2006.01) |
| *B60L 1/00* | (2006.01) |
| *B60L 15/20* | (2006.01) |
| *F16H 61/00* | (2006.01) |
| *B60K 6/543* | (2007.10) |
| *B60W 10/30* | (2006.01) |
| *B60W 20/00* | (2016.01) |
| *B60K 6/54* | (2007.10) |

(52) U.S. Cl.
CPC ............... *B60K 6/547* (2013.01); *B60L 1/003* (2013.01); *B60L 11/14* (2013.01); *B60L 15/2054* (2013.01); *B60W 10/30* (2013.01); *B60W 20/00* (2013.01); *F16H 61/0031* (2013.01); *B60L 2240/443* (2013.01); *F16H 2061/0037* (2013.01); *Y02T 10/6221* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/917* (2013.01)

(58) Field of Classification Search
USPC .................. 180/65.25, 65.26, 65.265, 65.275
See application file for complete search history.

(56) References Cited

U.S. PATENT DOCUMENTS

| | | | |
|---|---|---|---|
| 8,480,537 B2* | 7/2013 | Sano | B60K 6/48 180/65.285 |
| 8,763,736 B2* | 7/2014 | Mochiyama | F16H 61/0031 180/338 |
| 8,943,818 B2* | 2/2015 | Ogata | F16H 61/0031 60/421 |
| 2012/0011841 A1 | 1/2012 | Ogata et al. | |

FOREIGN PATENT DOCUMENTS

| | | |
|---|---|---|
| EP | 2 447 577 A1 | 5/2012 |
| JP | 2010-143264 A | 7/2010 |
| JP | 2012-096659 A | 5/2012 |
| JP | 2012-215246 A | 11/2012 |

OTHER PUBLICATIONS

Jun. 17, 2014 Search Report issued in International Patent Application No. PCT/JP2014/059333.

* cited by examiner

OIL SUPPLY DEVICE

BACKGROUND

The present disclosure relates to an oil supply device that supplies oil to a vehicle drive device that includes an input member drivably coupled to an internal combustion engine, a rotary electric machine for driving wheels, an output member drivably coupled to the wheels, a speed change device that includes a shifting engagement device and that at least transfers rotation of the input member to the output member with the speed of the rotation changed, and a decoupling engagement device that decouples the input member from the speed change device.

The vehicle drive device described above can decouple the internal combustion engine from the wheels to suppress an energy loss due to a drag resistance of the internal combustion engine by controlling the decoupling engagement device to a disengaged state during execution of an electric travel mode in which the vehicle is driven by only torque of the rotary electric machine. An example of such a vehicle drive device is described in German Patent Application Publication No. 102009042933.

In the configuration described in German Patent Application Publication No. 102009042933, the vehicle drive device requires an increased amount of oil in the case where torque of the internal combustion engine is transferred to the wheels to drive the vehicle with the decoupling engagement device controlled to a slipping engagement state, for example, and a hydraulic pump driven by the internal combustion engine or the rotary electric machine is designed in accordance with the amount of oil for this case. In the case where the vehicle is driven in the electric travel mode, a reduced amount of oil is required by the vehicle drive device. In the configuration described in German Patent Application Publication No. 102009042933, however, it is necessary to drive the hydraulic pump, which is designed to be relatively large in size as described above, also in this case. Therefore, large torque is required to drive the hydraulic pump, which accordingly reduces the energy efficiency, compared to a case of driving a hydraulic pump designed in accordance with the amount of oil required when the vehicle drive device is in the electric travel mode. The technology according to German Patent Application Publication No. 102009042933 leaves room for improvement in this point.

SUMMARY

Thus, there is desired an oil supply device that can supply an appropriate amount of oil to a vehicle drive device, while suppressing an increase in size of a hydraulic pump, in the case where torque of an internal combustion engine is transferred to wheels with an engagement device controlled to a slipping engagement state.

The present disclosure provides according to an exemplary aspect an oil supply device that supplies oil to a vehicle drive device that includes an input member drivably coupled to an internal combustion engine, a rotary electric machine for driving wheels, an output member drivably coupled to the wheels, a speed change device that includes a shifting engagement device and that at least transfers rotation of the input member to the output member with the speed of the rotation changed, and a decoupling engagement device that decouples the input member from the speed change device, including: a first hydraulic pump driven by one of a first interlocking member, which operates in conjunction with the input member, and a second interlocking member, which operates in conjunction with the rotary electric machine, that is rotating at a higher rotational speed; a second hydraulic pump driven by a drive force source that is different from a drive force source for the first hydraulic pump; a lubrication oil passage that supplies oil for lubrication to at least one of the decoupling engagement device and the shifting engagement device; a first engagement oil passage that supplies oil for controlling a state of engagement to the decoupling engagement device; a second engagement oil passage that supplies oil for controlling a state of engagement to the shifting engagement device; and a supply state control section that controls a state of supply of oil discharged from each of the first hydraulic pump and the second hydraulic pump to each of the oil passages, in which a state in which oil discharged from the first hydraulic pump is supplied to both the first engagement oil passage and the second engagement oil passage and in which at least oil discharged from the second hydraulic pump is supplied to the lubrication oil passage is defined as a first supply state; a state in which oil discharged from the first hydraulic pump is supplied to the second engagement oil passage and in which no oil is supplied to the first engagement oil passage or a state in which oil is supplied to neither the first engagement oil passage nor the second engagement oil passage is defined as a second supply state; and the supply state control section establishes the first supply state in the case where rotation of the input member is transferred to the output member with at least one of the decoupling engagement device and the shifting engagement device controlled to a slipping engagement state, and establishes the second supply state in the case where output torque of the rotary electric machine is transferred to the wheels with the decoupling engagement device controlled to a disengaged state.

The term "drivably coupled" as used herein refers to a state in which two rotary elements are coupled to each other in such a way that enables transfer of a drive force, which includes a state in which the two rotary elements are coupled to each other to rotate together with each other, and a state in which the two rotary elements are coupled to each other via one or two or more transmission members in such a way that enables transfer of a drive force. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device.

The term "rotary electric machine" as used herein refers to any of a motor (electric motor), a generator (electric generator), and a motor generator that functions both as a motor and as a generator as necessary.

The term "operate in conjunction" refers to a state in which a drive force is transferred between two rotary elements via a certain member so that one of the rotary elements rotates in accordance with rotation of the other of the rotary elements.

In the case where rotation of the input member is transferred to the output member with at least one of the decoupling engagement device and the shifting engagement device controlled to the slipping engagement state, it is necessary to supply a relatively large amount of oil to the lubrication oil passage. In the configuration described above, the supply state control section controls the oil supply state to the first supply state in the case where such control is executed. In the first supply state, oil discharged from the first hydraulic pump is supplied to both the first engagement oil passage and the second engagement oil passage, and at least oil discharged from the second hydraulic pump is supplied to the lubrication oil passage. That is, at least a part of oil required for the lubrication oil passage can be supplied by the second hydraulic pump which is separate from the first hydraulic pump which discharges oil to be supplied to both the first engagement oil passage and the second engagement oil passage. Therefore, it is possible to supply an appropriate amount of oil to the lubrication oil passage while accordingly reducing the first hydraulic pump in size. It is not necessary for the second hydraulic pump to discharge oil to be supplied to the first engagement oil passage and the second engagement oil passage in the first supply state. Therefore, the second hydraulic pump can be accordingly reduced in size.

In the configuration described above, further, the supply state control section controls the oil supply state to the second supply state in the case where output torque of the rotary electric machine is transferred to the output member with the decoupling engagement device controlled to the disengaged state. In the second supply state, oil discharged from the first hydraulic pump is supplied to the second engagement oil passage, and no oil is supplied to the first engagement oil passage, or oil is supplied to neither the first engagement oil passage nor the second engagement oil passage. Hence, the second hydraulic pump can be reduced in size compared to a case where oil discharged from the second hydraulic pump is supplied to the second engagement oil passage in the case where output torque of the rotary electric machine is transferred to the wheels with the decoupling engagement device controlled to the disengaged state.

According to the configuration described above, it is possible to supply an appropriate amount of oil to the vehicle drive device, while reducing the first hydraulic pump and the second hydraulic pump in size, in the case where output torque of the internal combustion engine is transferred to the wheels with at least one of the decoupling engagement device and the shifting engagement device controlled to the slipping engagement state. That is, while the second hydraulic pump is essential in order to supply a hydraulic pressure to the second engagement oil passage or supply oil for lubrication to the speed change device when the vehicle is driven with the internal combustion engine stationary, it is possible to suppress an increase in size of the first hydraulic pump utilizing the second hydraulic pump which is essential. As a result, the first hydraulic pump, which is driven in the case where output torque of the rotary electric machine is transferred to the wheels with the decoupling engagement device controlled to the disengaged state, is reduced in size, and the energy efficiency during execution of the electric travel mode can be accordingly improved.

Preferably, the supply state control section includes: a first check valve provided downstream of a discharge port of the first hydraulic pump; a second check valve provided downstream of a discharge port of the second hydraulic pump; a merged oil passage connected to both an oil passage provided downstream of the first check valve and an oil passage provided downstream of the second check valve, and connected to both the first engagement oil passage and the second engagement oil passage; a branched oil passage that is an oil passage branched from a connection oil passage that connects between the discharge port of the second hydraulic pump and the second check valve; a communication state control valve that controls a state of communication between the branched oil passage and the lubrication oil passage; and a valve control device that controls a state of the communication state control valve.

According to the configuration, oil discharged from the second hydraulic pump can be supplied to the lubrication oil passage not via the second check valve or an upstream portion of the merged oil passage by controlling the communication state control valve such that the branched oil passage and the lubrication oil passage communicate with each other. Hence, a pressure loss and leakage of oil that occur when oil is supplied from the discharge port of the second hydraulic pump to the lubrication oil passage can be suppressed, as a result of which the second hydraulic pump can be easily reduced in size. According to the configuration described above, in addition, the second hydraulic pump can supply oil for lubrication to at least one of the decoupling engagement device and the shifting engagement device irrespective of the state of the first hydraulic pump.

In the configuration described above in which the supply state control section includes the first check valve, the second check valve, the merged oil passage, the branched oil passage, the communication state control valve, and the valve control device, preferably, the supply state control section further includes a lubrication branched oil passage branched from the merged oil passage to be connected to the lubrication oil passage; the branched oil passage is connected to the lubrication oil passage not via the lubrication branched oil passage; and the communication state control valve includes a branched control valve portion that controls a state of communication between the branched oil passage and the lubrication oil passage and a lubrication control valve portion that controls a state of communication between the lubrication branched oil passage and the lubrication oil passage.

According to the configuration, the lubrication oil passage can be supplied with both oil discharged from the first hydraulic pump and oil discharged from the second hydraulic pump by controlling the branched control valve portion such that the branched oil passage communicates with the lubrication oil passage and controlling the lubrication control valve portion such that the lubrication branched oil passage communicates with the lubrication oil passage. This facilitates supplying an appropriate amount of oil to the lubrication oil passage. In the configuration, in addition, the branched oil passage is connected to the lubrication oil passage not via the merged oil passage which is connected to both the first engagement oil passage and the second engagement oil passage and not via the lubrication branched oil passage to which a relatively high hydraulic pressure is supplied. Therefore, the discharge pressure required from the second hydraulic pump when oil is supplied from the branched oil passage to the lubrication oil passage can be suppressed to be low. As a result, the second hydraulic pump can be reduced in size. Alternatively, a large amount of oil can be supplied from the second hydraulic pump to the lubrication oil passage, and the first hydraulic pump can be accordingly reduced in size.

In the configuration described above in which the communication state control valve includes the branched control valve portion, preferably, the branched control valve portion performs control so as to switch between a state in which the branched oil passage and the lubrication oil passage communicate with each other and a state in which the branched oil passage and the lubrication oil passage do not communicate with each other.

According to the configuration, oil discharged from the second hydraulic pump can be efficiently supplied to the merged oil passage by controlling the branched control valve portion to a state in which the branched oil passage and the lubrication oil passage do not communicate with each other in the case where it is necessary to supply oil discharged from the second hydraulic pump to the merged oil passage via the second check valve with the first hydraulic pump stationary.

In the configuration described above in which the supply state control section includes the first check valve, the second check valve, the merged oil passage, the branched oil passage, the communication state control valve, and the valve control device, preferably, the supply state control section further includes a lubrication branched oil passage branched from the merged oil passage to be connected to the lubrication oil passage; the branched oil passage is connected to the lubrication branched oil passage; and the communication state control valve includes a branched control valve portion that controls a state of communication between the branched oil passage and the lubrication branched oil passage.

According to the configuration, the lubrication oil passage can be supplied with both oil discharged from the first hydraulic pump and oil discharged from the second hydraulic pump by controlling the communication state control valve such that the branched oil passage communicates with the lubrication oil passage via the lubrication branched oil passage. This facilitates supplying an appropriate amount of oil to the lubrication oil passage. In the configuration, in addition, the branched oil passage is connected to the lubrication oil passage not via the merged oil passage which is connected to both the first engagement oil passage and the second engagement oil passage. Therefore, the discharge pressure required from the second hydraulic pump when oil is supplied from the branched oil passage to the lubrication oil passage can be suppressed to be low. As a result, the second hydraulic pump can be reduced in size. Alternatively, a large amount of oil can be supplied from the second hydraulic pump to the lubrication oil passage, and the first hydraulic pump can be accordingly reduced in size.

In the configuration described above in which the communication state control valve includes the branched control valve portion, preferably, the communication state control valve further includes a lubrication control valve portion that controls a state of communication between the lubrication branched oil passage and the lubrication oil passage.

This configuration facilitates controlling the flow rate of oil to be supplied to the lubrication oil passage. Hence, an appropriate amount of oil can be supplied to the lubrication oil passage in accordance with the need for supply to at least one of the decoupling engagement device and the shifting engagement device.

In the configuration described above in which the communication state control valve includes the branched control valve portion, preferably, the branched control valve portion performs control so as to switch between a state in which the branched oil passage and the lubrication branched oil passage communicate with each other and a state in which the branched oil passage and the lubrication branched oil passage do not communicate with each other.

According to the configuration, oil discharged from the second hydraulic pump can be efficiently supplied to the merged oil passage by controlling the branched control valve portion to a state in which the branched oil passage and the lubrication branched oil passage do not communicate with each other in the case where it is necessary to supply oil discharged from the second hydraulic pump to the merged oil passage via the second check valve with the first hydraulic pump stationary.

In the configuration described above in which the communication state control valve includes the lubrication control valve portion, preferably, the lubrication control valve portion performs control so as to switch a flow rate of oil that flows from the lubrication branched oil passage to the lubrication oil passage between a first flow rate and a second flow rate that is less than the first flow rate.

According to the configuration, the flow rate of oil to be supplied to the lubrication oil passage can be controlled using the lubrication control valve portion which has a relatively simple configuration. Moreover, an appropriate amount of oil can be supplied to the lubrication oil passage in accordance with the need for supply to at least one of the decoupling engagement device and the shifting engagement device.

In the configuration described above in which the supply state control section includes the first check valve, the second check valve, the merged oil passage, the branched oil passage, the communication state control valve, and the valve control device, preferably, the branched oil passage is connected to the lubrication oil passage not via the oil passage provided downstream of the second check valve.

According to the configuration, the oil passage provided downstream of the second check valve can be separated from the lubrication oil passage, which simplifies the configuration of the communication state control valve and facilitates enhancing the controllability of a hydraulic pressure in each of the oil passages.

In the configuration described above in which the branched oil passage is connected to the lubrication oil passage not via the oil passage provided downstream of the second check valve, preferably, the communication state control valve performs control so as to switch between a state in which the branched oil passage and the lubrication oil passage communicate with each other and a state in which the branched oil passage and the lubrication oil passage do not communicate with each other.

According to the configuration, oil discharged from the second hydraulic pump can be supplied to the lubrication oil passage by controlling the communication state control valve such that the branched oil passage communicates with the lubrication oil passage. In addition, oil discharged from the second hydraulic pump can be efficiently supplied to the merged oil passage by controlling the communication state control valve to a state in which the branched oil passage and the lubrication oil passage do not communicate with each other in the case where it is necessary to supply oil discharged from the second hydraulic pump to the merged oil passage via the second check valve with the first hydraulic pump stationary.

Preferably, the vehicle drive device is configured such that:

(1) the rotary electric machine is drivably coupled between the input member and the speed change device in a power transfer path of the vehicle drive device, the decoupling engagement device is provided between the input member and the rotary electric machine in the power transfer path, the first interlocking member is a member coupled to the input member at all times, and the second interlocking member is a member coupled to the rotary electric machine at all times; or (2) the rotary electric machine is drivably coupled to the wheels not via the speed change device, the first interlocking member is a member coupled to the input member at all times, and the second interlocking member is a member coupled to the output member at all times.

According to the configuration in (1) or (2), the first hydraulic pump can be driven by output torque of the internal combustion engine in a state in which rotation of the first interlocking member which operates in conjunction with the input member is faster than rotation of the second interlocking member which operates in conjunction with the rotary electric machine with the internal combustion engine operating. In the so-called electric travel mode in which the wheels are driven by output torque of the rotary electric machine with the internal combustion engine stationary, the first hydraulic pump can be driven by output torque of the rotary electric machine which is transferred to the second interlocking member directly or via the wheels and the output member. Thus, also in the electric travel mode in which the internal combustion engine is stationary, the first hydraulic pump can be driven to supply a hydraulic pressure required to engage an engagement device, a hydraulic pressure required to lubricate the speed change device, and so forth. Thus, it is possible to suppress the amount of oil discharged by the second hydraulic pump to be small, which reduces the second hydraulic pump in size and hence reduces the oil supply device in size.

DETAILED DESCRIPTION OF THE EMBODIMENTS

1. First Embodiment

An oil supply device according to a first embodiment of the present disclosure will be described with reference to FIGS. 1 to 4.

1-1. Overall Configuration of Vehicle Drive Device

Figure 1:
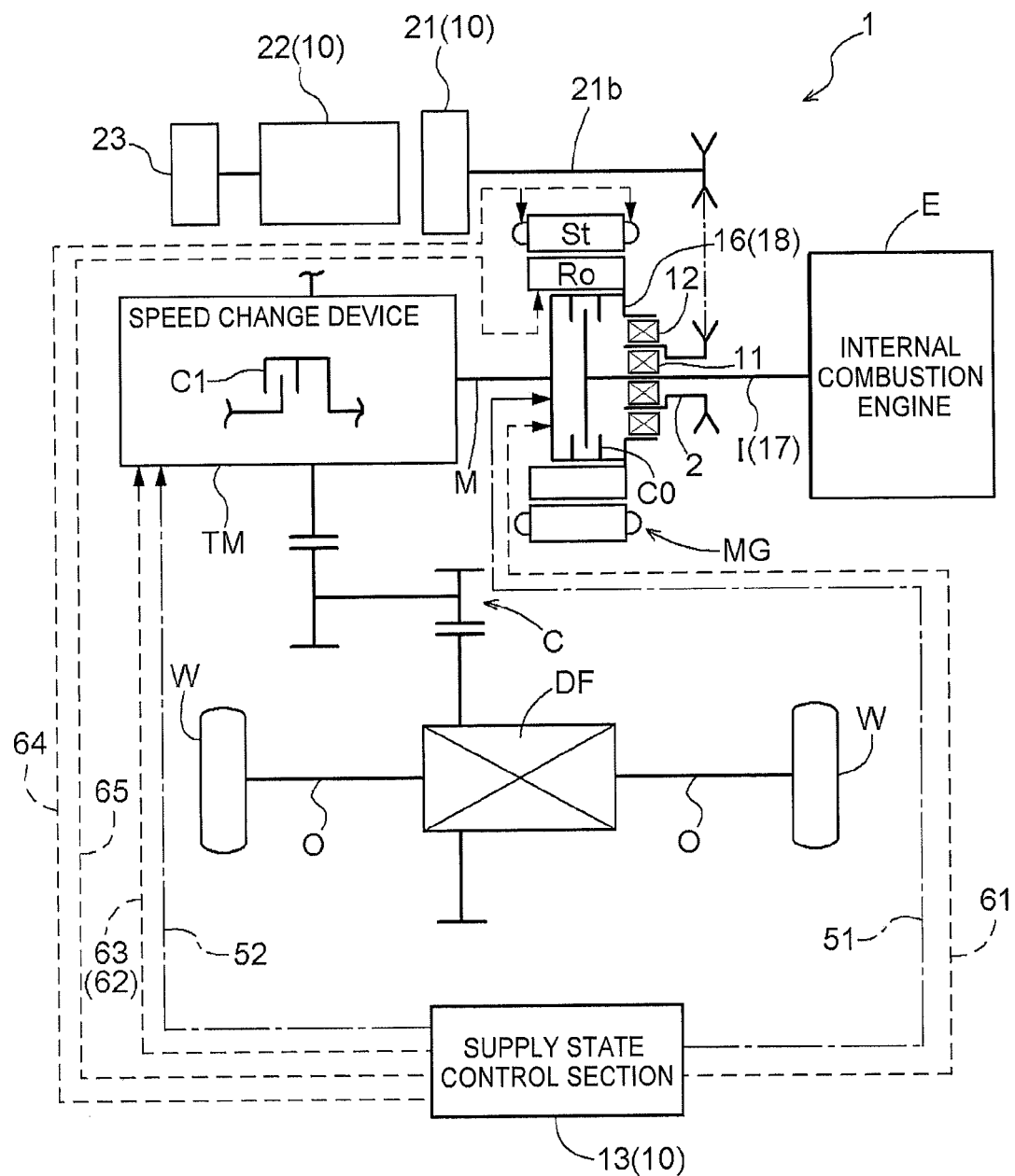
FIG. 1 is a schematic diagram illustrating a schematic configuration (first configuration) of a vehicle drive device according to a first embodiment of the present disclosure.

First, the configuration of a vehicle drive device 1 supplied with oil by an oil supply device 10 according to the embodiment will be described. As illustrated in FIG. 1, the vehicle drive device 1 according to the embodiment includes an input shaft I drivably coupled to an internal combustion engine E, output shafts O drivably coupled to wheels W, a decoupling engagement device C0, a rotary electric machine MG for driving wheels, a speed change device TM, a gear mechanism C, and a differential gear device DF. The decoupling engagement device C0, the rotary electric machine MG, the speed change device TM, the gear mechanism C, and the differential gear device DF are provided in a power transfer path that connects between the input shaft I and the output shafts O to compose a power transfer mechanism of the vehicle. Such components are provided in the order in which they were mentioned from the side of the input shaft I. That is, the decoupling engagement device C0, the rotary electric machine MG, and the speed change device TM are provided in the power transfer path which connects between the input shaft I and the output shafts O in this order from the side of the input shaft I. In the embodiment, the input shaft I corresponds to the "input member" according to the present disclosure, and the output shafts O correspond to the "output member" according to the present disclosure.

The internal combustion engine E is a motor (such as a gasoline engine and a diesel engine, for example) driven by combusting fuel inside the engine to take out power. In the embodiment, the input shaft I is drivably coupled to an output shaft (such as a crankshaft) of the internal combustion engine E so as to rotate together with the output shaft. The input shaft I may be drivably coupled to the output shaft of the internal combustion engine E via a damper or the like. The rotary electric machine MG includes a stator St fixed to a case (not illustrated) and a rotor Ro supported so as to be rotatable with respect to the stator St. In the embodiment, the rotor Ro is disposed radially inwardly of the stator St. In the embodiment, oil for cooling is supplied to the rotary electric machine MG via a fourth lubrication oil passage 64 and a fifth lubrication oil passage 65. Specifically, oil supplied via the fourth lubrication oil passage 64 is supplied to the rotary electric machine MG from the upper side utilizing the gravitational force, and cools a coil end portion of the stator St etc., for example. Meanwhile, oil supplied via the fifth lubrication oil passage 65 is supplied to the rotary electric machine MG from the radially inner side (the side of the axis) utilizing a centrifugal force, and cools a permanent magnet provided in the rotor Ro, the coil end portion of the stator St, etc., for example. In the embodiment, the rotor Ro of the rotary electric machine MG is drivably coupled to the intermediate shaft M via a rotor support member 16 so as to rotate together with the intermediate shaft M.

The decoupling engagement device C0 is an engagement device that decouples the input shaft I from the speed change device TM. In the embodiment, the rotary electric machine MG is provided in the power transfer path between the input shaft I and the speed change device TM, and the decoupling engagement device C0 is provided in the power transfer path between the input shaft I and the rotary electric machine MG. Thus, here, the decoupling engagement device C0 serves as an engagement device that decouples the input shaft I from the rotary electric machine MG and the speed change device TM. Specifically, the decoupling engagement device C0 includes an input-side engagement member drivably coupled to the input shaft I, and an output-side engagement member drivably coupled to the rotor Ro of the rotary electric machine MG. With the decoupling engagement device C0 engaged, coupling between the internal combustion engine E and the rotary electric machine MG and the intermediate shaft M is maintained With the decoupling engagement device C0 disengaged (disengaged state), coupling between the internal combustion engine E and the rotary electric machine MG and the intermediate shaft M is released.

Here, the term "engaged state" used for an engagement device refers to a state in which the engagement device is producing a transfer torque capacity, that is, a state in which the transfer torque capacity of the engagement device is larger than zero. The "engaged state" includes a "direct engagement state" in which there is no difference between the respective rotational speeds of engagement members of the engagement device, and a "slipping engagement state" in which there is a difference between the respective rotational speeds of engagement members of the engagement device. Meanwhile, the phrase "disengaged state" used for an engagement device refers to a state in which the engagement device is not producing a transfer torque capacity, that is, a state in which the transfer torque capacity of the engagement device is zero. In the case where the engagement device is a friction engagement device, a transfer torque capacity is occasionally produced by dragging between the engagement members (friction members) even in the case where a control device is not outputting a command to produce a transfer torque capacity. Herein, the "disengaged state" also includes a state in which a transfer torque capacity is produced by such dragging in the case where a command to produce a transfer torque capacity is not output.

The decoupling engagement device C0 is a hydraulically driven engagement device that includes a hydraulic servo mechanism that operates in accordance with a supplied hydraulic pressure. In the embodiment, the decoupling engagement device C0 is a friction engagement device that transfers torque using a friction force generated between engagement members that engage with each other. Specifically, the decoupling engagement device C0 is a wet friction engagement device that includes a wet multi-plate clutch mechanism. Although not illustrated, the decoupling engagement device C0 includes a working hydraulic pressure chamber that is supplied with oil for controlling the state of engagement. Oil is supplied to the working hydraulic pressure chamber via a first engagement oil passage 51. The state of engagement of the decoupling engagement device C0 is controlled by controlling a hydraulic pressure in the working hydraulic pressure chamber so as to slide a piston that presses the engagement members (friction members).

In addition, oil for lubrication is supplied to the decoupling engagement device C0 via a first lubrication oil passage 61. The oil supplied via the first lubrication oil passage 61 is supplied to the engagement members of the decoupling engagement device C0 so that oil flowing over the surfaces of the engagement members lubricates and cools the engagement members. In the embodiment, an oil passage connected to the downstream side of the first lubrication oil passage 61 is formed so as to supply oil to the engagement members of the decoupling engagement device C0 from the radially inner side (the side of the axis) utilizing a centrifugal force. Oil that has lubricated the engagement members is discharged to the outside of the decoupling engagement device C0 via a discharge hole, a discharge oil passage, etc., for example, and returned to an oil reserving portion (not illustrated). The oil reserving portion is constituted of an oil pan or the like, for example.

The speed change device TM is a device that includes a shifting engagement device C1 and that at least transfers rotation of the input shaft I to the output shafts O with the speed of the rotation changed. In the embodiment, the speed change device TM is constituted of a mechanism that is capable of changing the speed ratio stepwise or continuously (such as a stepped automatic transmission or a continuously variable automatic transmission, for example), and transfers rotation of the intermediate shaft M (a transmission input shaft) to the gear mechanism C with the speed of the rotation changed with a current speed ratio. That is, the speed change device TM transfers rotation of the input shaft I or the rotary electric machine MG to the output shafts O with the speed of the rotation changed. In the embodiment, in order to establish a plurality of shift speeds, the speed change device TM includes one or two or more gear mechanisms, such as planetary gear mechanisms, and the shifting engagement device C1 which engages and disengages rotary elements of the gear mechanisms to switch between the shift speeds. The speed change device TM includes a plurality of such shifting engagement devices C1. The state of engagement of each of the plurality of shifting engagement devices C1 is controlled so as to switch between the plurality of shift speeds. In FIG. 1, only one of the plurality of shifting engagement devices C1 is illustrated. Oil for lubrication is supplied to the speed change device TM via a third lubrication oil passage 63. The oil supplied via the third lubrication oil passage 63 is used to lubricate and cool the gear mechanisms, bearings, etc. of the speed change device TM.

The shifting engagement device C1 is a hydraulically driven engagement device. In the embodiment, the shifting engagement device C1 is a friction engagement device. The shifting engagement device C1 is a wet friction engagement device that includes a wet multi-plate clutch mechanism, for example. Although not illustrated, the shifting engagement device C1 includes a working hydraulic pressure chamber that is supplied with oil for controlling the state of engagement. Oil is supplied to the working hydraulic pressure chamber via a second engagement oil passage 52. The state of engagement of the shifting engagement device C1 is controlled by controlling a hydraulic pressure in the working hydraulic pressure chamber.

The gear mechanism C (in the example, a counter gear mechanism) is drivably coupled to the two, left and right, output shafts O via the differential gear device (output differential gear device) DF. Rotation and torque transferred from the speed change device TM side to the gear mechanism C are distributed and transferred to the two, left and right, output shafts O (that is, the two, left and right, wheels W) via the differential gear device DF. This allows the vehicle drive device 1 to transfer torque of one or both of the internal combustion engine E and the rotary electric machine MG to the wheels W to drive the vehicle. That is, the vehicle drive device 1 is constituted as a drive device for a hybrid vehicle, specifically a one-motor parallel type hybrid drive device.

1-2. Configuration of Oil Supply Device

Figure 2:
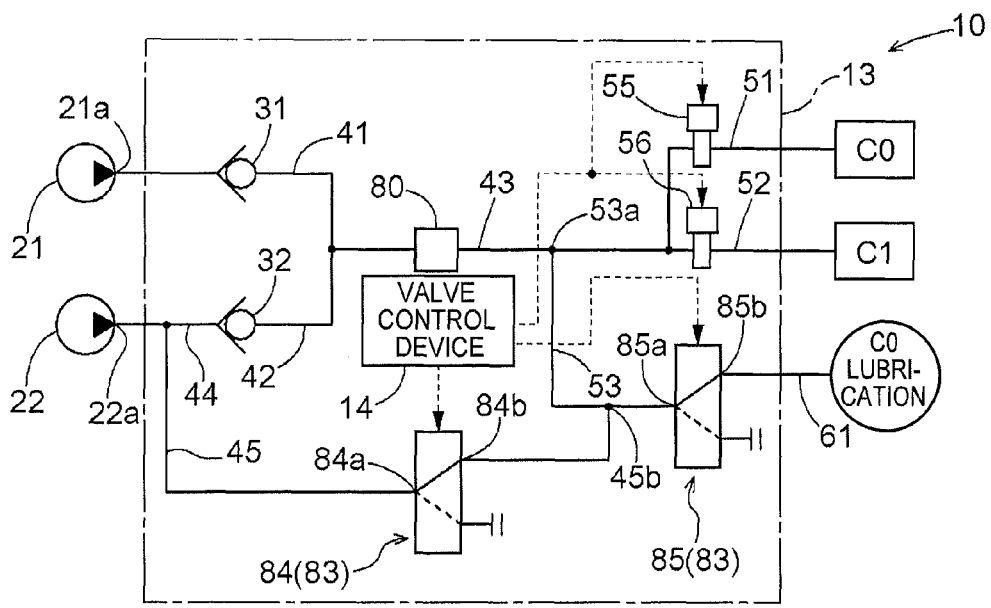
FIG. 2 is a schematic diagram illustrating a schematic configuration of an oil supply device according to the first embodiment of the present disclosure.

Next, the configuration of the oil supply device as an essential portion of the present disclosure will be described. The oil supply device 10 is a device that supplies oil to the vehicle drive device 1. As illustrated in FIG. 2, the oil supply device 10 includes a first hydraulic pump 21, a second hydraulic pump 22, the first lubrication oil passage 61, the first engagement oil passage 51, the second engagement oil passage 52, and a supply state control section 13 that controls the state of supply of oil discharged from each of the first hydraulic pump 21 and the second hydraulic pump 22 to each of the oil passages. In the embodiment, as illustrated in FIG. 1, the oil supply device 10 further includes the third lubrication oil passage 63 which supplies oil for lubrication to the speed change device TM, and the fourth lubrication oil passage 64 and the fifth lubrication oil passage 65 which supply oil for cooling to the rotary electric machine MG. In FIG. 2, however, the third lubrication oil passage 63, the fourth lubrication oil passage 64, and the fifth lubrication oil passage 65 are not illustrated for simplicity.

The first hydraulic pump 21 is a hydraulic pump (mechanical pump) driven by the internal combustion engine E or the rotary electric machine MG that serves as a drive force for the wheels W. The first hydraulic pump 21 is configured to be driven by one of a first interlocking member 17, which operates in conjunction with the input shaft I, and a second interlocking member 18, which operates in conjunction with the rotary electric machine MG, that is rotating at a higher speed. In the embodiment, the first interlocking member 17 is a member coupled to the input shaft I at all times. Here, the input shaft I itself corresponds to the first interlocking member 17. In the embodiment, meanwhile, the second interlocking member 18 is a member coupled to the rotary electric machine MG at all times. Here, the rotor support member 16 corresponds to the second interlocking member 18. As illustrated in FIG. 1, a drive member 2 that drives the first hydraulic pump 21 is drivably coupled to the input shaft I (first interlocking member 17) via a first one-way clutch 11, and drivably coupled to the rotor support member 16 (second interlocking member 18) via a second one-way clutch 12. The first one-way clutch 11 and the second one-way clutch 12 are configured such that the direction in which rotation of the input shaft I relative to the drive member 2 is restricted and the direction in which rotation of the rotor support member 16 relative to the drive member 2 is restricted are the same as each other. Hence, the first hydraulic pump 21 is driven by one of the input shaft I and the rotor support member 16 that is rotating at a higher rotational speed in the direction of restriction. That is, the first hydraulic pump 21 is driven by one of rotation transferred from the internal combustion engine E to the first one-way clutch 11 via the input shaft I and rotation transferred from the rotary electric machine MG to the second one-way clutch 12 via the rotor support member 16 that is at a higher rotational speed. Here, comparison between rotational speeds is performed on the basis of the rotational speed (converted rotational speed) transferred to an identical member. That is, the first hydraulic pump 21 is driven by one of the input shaft I and the rotary electric machine MG, the rotational speed (converted rotational speed) of which transferred to an identical member (here, the drive member 2 which is drivably coupled to both the first one-way clutch 11 and the second one-way clutch 12) is higher. In the example illustrated in FIG. 1, the first hydraulic pump 21 is disposed on an axis that is different from the axes of the input shaft I and the rotary electric machine MG, and a drive shaft 21b of the first hydraulic pump 21 is drivably coupled to the drive member 2 so as to rotate in conjunction with the drive member 2 via a sprocket and a chain. The first hydraulic pump 21 may be disposed coaxially with the input shaft I and the rotary electric machine MG.

The second hydraulic pump 22 is a hydraulic pump driven by a drive force source that is different from the drive force source for the first hydraulic pump 21. In the embodiment, the second hydraulic pump 22 is driven by a dedicated drive force source. Here, the dedicated drive force source is a drive force source provided exclusively to drive the second hydraulic pump 22. In the embodiment, as illustrated in FIG. 1, the second hydraulic pump 22 is an electric pump driven by a rotary electric machine (electric motor 23) that serves as the dedicated drive force source. Although not illustrated, each of the first hydraulic pump 21 and the second hydraulic pump 22 includes an intake port connected to the oil reserving portion (such as an oil pan, for example) via a strainer, and generates a hydraulic pressure by suctioning oil reserved in the oil reserving portion through the intake port. An internal gear pump, an external gear pump, a vane pump, or the like may be used as the first hydraulic pump 21 and the second hydraulic pump 22, for example.

The first lubrication oil passage 61 is an oil passage that supplies oil for lubrication to the decoupling engagement device C0. In the embodiment, as discussed above, an oil passage connected to the downstream side of the first lubrication oil passage 61 is formed so as to supply oil to the engagement members of the decoupling engagement device C0 from the radially inner side (the side of the axis). As discussed later, oil discharged from one or both of the first hydraulic pump 21 and the second hydraulic pump 22 is supplied to the first lubrication oil passage 61 in accordance with the supply state achieved by the supply state control section 13. In the embodiment, the first lubrication oil passage 61 corresponds to the "lubrication oil passage" according to the present disclosure.

The first engagement oil passage 51 is an oil passage that supplies oil for controlling the state of engagement to the decoupling engagement device C0. The first engagement oil passage 51 is connected to a merged oil passage 43 on the upstream side via a first supply control valve 55. An oil passage connected to the downstream side of the first engagement oil passage 51 is connected to the working hydraulic pressure chamber of the decoupling engagement device C0. Here, the first supply control valve 55 is a pressure regulation valve (e.g. a linear solenoid valve) that regulates a hydraulic pressure (in the embodiment, a line pressure) from the upstream side to control a hydraulic pressure to be supplied to the working hydraulic pressure chamber. An output hydraulic pressure of the first supply control valve 55 is controlled by a valve control device 14 to be discussed later so as to control a hydraulic pressure to be supplied to the first engagement oil passage 51 and control the state of engagement of the decoupling engagement device C0. For example, the decoupling engagement device C0 is basically controlled to a disengaged state during execution of an electric travel mode in which the vehicle is driven by only torque of the rotary electric machine MG. The decoupling engagement device C0 is basically controlled to a direct engagement state during execution of a hybrid travel mode in which the vehicle is driven by torque of both the internal combustion engine E and the rotary electric machine MG. Meanwhile, in the case where the vehicle is made stationary with torque of the internal combustion engine E transferred to the wheels W on a slope or the like, or in the case where the vehicle is started by only torque of the internal combustion engine E, for example, it is necessary to control at least one of the decoupling engagement device C0 and the shifting engagement device C1 to a slipping engagement state. In the embodiment, in such a case, at least the decoupling engagement device C0 (basically, only the decoupling engagement device C0) is controlled to a slipping engagement state.

The second engagement oil passage 52 is an oil passage that supplies oil for controlling the state of engagement to each of the plurality of shifting engagement devices C1 of the speed change device TM. The second engagement oil passage 52 is connected to the merged oil passage 43 on the upstream side via a second supply control valve 56. An oil passage connected to the downstream side of the second engagement oil passage 52 is connected to the working hydraulic pressure chambers of the shifting engagement devices C1. The speed change device TM includes a plurality of shifting engagement devices C1 as discussed above, and the oil supply device 10 includes second engagement oil passages 52, the number of which is the same as the number of the shifting engagement devices C1. In FIG. 2, only one of the plurality of shifting engagement devices C1 is illustrated as a representative, and only one of the second engagement oil passages 52 that is connected to the one shifting engagement device C1 is illustrated. Here, the second supply control valve 56 is a pressure regulation valve (e.g. a linear solenoid valve) that regulates a hydraulic pressure (in the embodiment, a line pressure) from the upstream side to control a hydraulic pressure to be supplied to the working hydraulic pressure chamber. An output hydraulic pressure of the second supply control valve 56 is controlled by the valve control device 14 to be discussed later so as to control a hydraulic pressure to be supplied to the second engagement oil passage 52 and control the state of engagement of the shifting engagement device C1.

As illustrated in FIG. 2, the supply state control section 13 includes a first check valve 31, a second check valve 32, the merged oil passage 43, a pressure regulation device 80, a branched oil passage 45, a communication state control valve 83, and the valve control device 14 in addition to the first supply control valve 55 and the second supply control valve 56 discussed above. In the embodiment, the supply state control section 13 further includes a lubrication branched oil passage 53.

The first check valve 31 is provided downstream of a first discharge port 21a, which is a discharge port of the first hydraulic pump 21, to restrict a flow of oil toward the upstream side in a first discharge oil passage 41, which is a flow passage for oil discharged from the first hydraulic pump 21. That is, the first check valve 31 restricts (substantially prevents) a reverse flow of oil in the first discharge oil passage 41. The second check valve 32 is provided downstream of a second discharge port 22a, which is a discharge port of the second hydraulic pump 22, to restrict a flow of oil toward the upstream side in a second discharge oil passage 42, which is a flow passage for oil discharged from the second hydraulic pump 22. That is, the second check valve 32 restricts (substantially prevents) a reverse flow of oil in the second discharge oil passage 42.

The merged oil passage 43 is an oil passage connected to both the oil passage provided downstream of the first check valve 31 and the oil passage provided downstream of the second check valve 32, connected to the first engagement oil passage 51 via the first supply control valve 55, and connected to the second engagement oil passage 52 via the second supply control valve 56. The merged oil passage 43 is formed with the first discharge oil passage 41 and the second discharge oil passage 42 merged with each other. The first discharge oil passage 41 and the second discharge oil passage 42 are connected to the upstream side of the merged oil passage 43 in parallel with each other. In addition, the first engagement oil passage 51 and the second engagement oil passage 52 are connected to the downstream side of the merged oil passage 43 in parallel with each other.

The lubrication branched oil passage 53 is an oil passage branched from the merged oil passage 43 at a branched portion 53a to be connected to the first lubrication oil passage 61. The branched oil passage 45, which is an oil passage branched from a connection oil passage 44 (in other words, a portion of the second discharge oil passage 42 provided upstream of the second check valve 32) that connects between the second discharge port 22a and the second check valve 32, is connected to the lubrication branched oil passage 53. That is, the branched oil passage 45 is configured to communicate with the lubrication branched oil passage 53 not by way of the merged oil passage 43 (that is, so as to bypass the merged oil passage 43). The branched oil passage 45 is connected to the lubrication branched oil passage 53 at a connection portion 45b of the lubrication branched oil passage 53 provided upstream of a portion of connection with the first lubrication oil passage 61. Providing such a branched oil passage 45 makes it possible to supply oil discharged by the second hydraulic pump 22 to the first lubrication oil passage 61 not via the merged oil passage 43 as discussed later.

The pressure regulation device 80 is a device that regulates a hydraulic pressure in at least a portion of the merged oil passage 43 provided upstream of the first engagement oil passage 51 and the second engagement oil passage 52. Specifically, the pressure regulation device 80 controls a hydraulic pressure in the above-described portion of the merged oil passage 43 to the line pressure. The hydraulic pressure (that is, the line pressure) regulated by the pressure regulation device 80 is supplied to the first engagement oil passage 51 and the second engagement oil passage 52. In the example illustrated in FIG. 2, the hydraulic pressure regulated by the pressure regulation device 80 is supplied to the lubrication branched oil passage 53. As in the specific example illustrated in FIG. 4 to be discussed later, however, a pressure regulation device (in the example illustrated in FIG. 4, a second pressure regulation valve 82) that regulates a hydraulic pressure in at least a portion of the lubrication branched oil passage 53 that includes the connection portion 45b of the branched oil passage 45 may be provided separately from the pressure regulation device 80.

The communication state control valve 83 is a valve that controls the state of communication between the branched oil passage 45 and the first lubrication oil passage 61. The state of the communication state control valve 83 is controlled by the valve control device 14. The valve control device 14 controls the state of the first supply control valve 55 which is provided upstream of the first engagement oil passage 51 and the state of the second supply control valve 56 which is provided upstream of the second engagement oil passage 52 in addition to the state of the communication state control valve 83.

The valve control device 14 includes an arithmetic processing unit such as a CPU that serves as a core member, a storage device such as a RAM and a ROM, and so forth. Various functions executed by the valve control device 14 are implemented by software (a program) stored in the ROM or the like, hardware such as a separately provided arithmetic circuit, or a combination of both. Although not described in detail, the valve control device 14 is configured to communicate with a vehicle control unit (not illustrated) that integrally controls the entire vehicle, and the valve control device 14 and the vehicle control unit are configured to share various information and perform cooperative control. The vehicle control unit is configured to communicate with a rotary electric machine control device that controls operation of the rotary electric machine MG and an internal combustion engine control device that controls operation of the internal combustion engine E, besides the valve control device 14, and further configured to be capable of acquiring information on the result of detection performed by various sensors (such as an accelerator operation amount sensor, a vehicle speed sensor, and an oil temperature sensor, for example) provided in the vehicle. In addition, the valve control device 14 is configured to be capable of controlling operation of the electric motor 23, which serves as the drive force source for the second hydraulic pump 22, directly or via the vehicle control unit. The valve control device 14 controls the state of the various valves in accordance with the control state of the vehicle drive device 1 which is controlled by the vehicle control unit, and controls the operating state (such as the operating voltage, for example) of the second hydraulic pump 22.

In the embodiment, the branched oil passage 45 is connected to the first lubrication oil passage 61 via a portion of the lubrication branched oil passage 53 provided downstream of the connection portion 45*b*. Therefore, a state in which the branched oil passage 45 and the first lubrication oil passage 61 communicate with each other is achieved by performing control so as to communicate the branched oil passage 45 and the lubrication branched oil passage 53 with each other and performing control so as to communicate the lubrication branched oil passage 53 and the first lubrication oil passage 61 with each other. In order to enable such control, as illustrated in FIG. 2, the communication state control valve 83 includes a branched control valve portion 84 that controls the state of communication between the branched oil passage 45 and the lubrication branched oil passage 53 and a lubrication control valve portion 85 that controls the state of communication between the lubrication branched oil passage 53 and the first lubrication oil passage 61. In the example illustrated in FIG. 2, the branched control valve portion 84 and the lubrication control valve portion 85 are constituted as independent valves.

The branched control valve portion 84 performs control so as to switch between a state in which the branched oil passage 45 and the lubrication branched oil passage 53 communicate with each other and a state in which the branched oil passage 45 and the lubrication branched oil passage 53 do not communicate with each other. The branched control valve portion 84 is a switching valve controlled in accordance with a control signal from the valve control device 14 or a signal hydraulic pressure from another valve (not illustrated) controlled by the valve control device 14. In the example illustrated in FIG. 2, the branched control valve portion 84 is provided in the branched oil passage 45. The branched control valve portion 84 includes an input port 84*a* connected to a portion of the branched oil passage 45 provided upstream of the branched control valve portion 84, an output port 84*b* connected to a portion of the branched oil passage 45 provided downstream of the branched control valve portion 84, and a valve element (spool) that slides inside a sleeve in which such ports are formed. Switching is performed between a state in which the input port 84*a* and the output port 84*b* communicate with each other indicated by the solid line in FIG. 2 and a state in which the input port 84*a* and the output port 84*b* do not communicate with each other indicated by the broken line in FIG. 2 in accordance with the position of the valve element which is controlled by the valve control device 14. In the state in which the input port 84*a* and the output port 84*b* communicate with each other, the branched oil passage 45 and the lubrication branched oil passage 53 communicate with each other. In the state in which the input port 84*a* and the output port 84*b* do not communicate with each other, the branched oil passage 45 and the lubrication branched oil passage 53 do not communicate with each other.

The lubrication control valve portion 85 performs control so as to switch the flow rate of oil that flows from the lubrication branched oil passage 53 to the first lubrication oil passage 61 between a first flow rate and a second flow rate that is less than the first flow rate. As with the branched control valve portion 84, the lubrication control valve portion 85 is also a switching valve controlled in accordance with a control signal from the valve control device 14 or a signal hydraulic pressure from another valve (not illustrated) controlled by the valve control device 14. In the example illustrated in FIG. 2, the lubrication control valve portion 85 is provided at a portion of connection between the lubrication branched oil passage 53 and the first lubrication oil passage 61. The second flow rate is set to one-tenth or one-twentieth of the first flow rate, for example. Alternatively, the second flow rate may be set to zero. In this case, the lubrication control valve portion 85 performs control so as to switch between a state in which the lubrication branched oil passage 53 and the first lubrication oil passage 61 communicate with each other and a state in which the lubrication branched oil passage 53 and the first lubrication oil passage 61 do not communicate with each other. In the example illustrated in FIG. 2, the latter configuration is adopted.

Specifically, in the example illustrated in FIG. 2, the lubrication control valve portion 85 includes an input port 85*a* connected to the lubrication branched oil passage 53, an output port 85*b* connected to the first lubrication oil passage 61, and a valve element (spool) that slides inside a sleeve in which such ports are formed. Switching is performed between a state in which the input port 85*a* and the output port 85*b* communicate with each other indicated by the solid line in FIG. 2 and a state in which the input port 85*a* and the output port 85*b* do not communicate with each other indicated by the broken line in FIG. 2 in accordance with the position of the valve element which is controlled by the valve control device 14. In the state in which the input port 85*a* and the output port 85*b* communicate with each other, the lubrication branched oil passage 53 and the first lubrication oil passage 61 communicate with each other (in other words, the flow rate of oil that flows from the lubrication branched oil passage 53 to the first lubrication oil passage 61 is the first flow rate). In the state in which the input port 85*a* and the output port 85*b* do not communicate with each other, the lubrication branched oil passage 53 and the first lubrication oil passage 61 do not communicate with each other (in other words, the flow rate of oil that flows from the lubrication branched oil passage 53 to the first lubrication oil passage 61 is the second flow rate).

The valve control device 14 controls the state of the lubrication control valve portion 85 in accordance with the control state of the decoupling engagement device C0. In the embodiment, the valve control device 14 controls the state of the lubrication control valve portion 85 so as to switch the flow rate of oil that flows from the lubrication branched oil passage 53 to the first lubrication oil passage 61 to the first flow rate in the case where the decoupling engagement device C0 is controlled to the slipping engagement state. Consequently, the decoupling engagement device C0 can be appropriately cooled by supplying a large amount of oil from the lubrication branched oil passage 53 to the first lubrication oil passage 61 in the case where the decoupling engagement device C0 generates a large amount of heat. In the case where the decoupling engagement device C0 is controlled to the slipping engagement state, at least one of the internal combustion engine E and the rotary electric machine MG is rotating, and therefore at least the first hydraulic pump 21, among the first hydraulic pump 21 and the second hydraulic pump 22, is driven. Therefore, oil discharged from the first hydraulic pump 21 is supplied to the first lubrication oil passage 61 via the merged oil passage 43 and the lubrication branched oil passage 53. In addition, oil discharged from the first hydraulic pump 21 is also supplied to the first supply control valve 55 and the second supply control valve 56 via the merged oil passage 43. In this event, the shifting engagement device C1 is controlled to the direct engagement state or the slipping engagement state. Thus, oil discharged from the first hydraulic pump 21 is supplied to both the first engagement oil passage 51 and the second engagement oil passage 52 via the first supply control valve 55 and the second supply control valve 56, respectively.

On the other hand, the valve control device 14 controls the state of the lubrication control valve portion 85 so as to switch the flow rate of oil that flows from the lubrication branched oil passage 53 to the first lubrication oil passage 61 to the second flow rate (in the example illustrated in FIG. 2, zero) in the case where the decoupling engagement device C0 is controlled to the direct engagement state or the disengaged state. Consequently, drag torque generated by the stirring resistance of oil in the decoupling engagement device C0 can be suppressed by reducing the amount of oil supplied from the lubrication branched oil passage 53 to the first lubrication oil passage 61, or bringing the amount of such oil to zero, in the case where the decoupling engagement device C0 generates a small amount of heat. In addition, oil discharged from the first hydraulic pump 21 is also supplied to the first supply control valve 55 and the second supply control valve 56 via the merged oil passage 43. In this event, the shifting engagement device C1 is controlled to the direct engagement state or the slipping engagement state. Thus, oil discharged from the first hydraulic pump 21 is supplied to only the second engagement oil passage 52 via the second supply control valve 56 in the case where the decoupling engagement device C0 is controlled to the disengaged state, and oil discharged from the first hydraulic pump 21 is supplied to both the first engagement oil passage 51 and the second engagement oil passage 52 via the first supply control valve 55 and the second supply control valve 56, respectively, in the case where the decoupling engagement device C0 is controlled to the direct engagement state.

In addition, the valve control device 14 controls the state of the branched control valve portion 84 in accordance with the control state of the decoupling engagement device C0. In the embodiment, the valve control device 14 controls the state of the branched control valve portion 84 so as to switch to a state in which the branched oil passage 45 and the lubrication branched oil passage 53 communicate with each other in the case where the decoupling engagement device C0 is controlled to the slipping engagement state. In this event, the second hydraulic pump 22 is also driven so that oil discharged from the second hydraulic pump 22 is supplied to the first lubrication oil passage 61 via the branched oil passage 45 and the lubrication branched oil passage 53. Hence, oil discharged from the second hydraulic pump 22 can be supplied to the first lubrication oil passage 61 in addition to oil discharged from the first hydraulic pump 21 in the case where the decoupling engagement device C0 generates a large amount of heat. Consequently, each of the first hydraulic pump 21 and the second hydraulic pump 22 can be reduced in size while appropriately securing the cooling performance of the decoupling engagement device C0.

On the other hand, the valve control device 14 controls the state of the branched control valve portion 84 so as to switch to a state in which the branched oil passage 45 and the lubrication branched oil passage 53 do not communicate with each other in the case where the decoupling engagement device C0 is controlled to the direct engagement state or the disengaged state. In this event, the second hydraulic pump 22 is basically stopped. In the case where a different oil passage (in the specific example illustrated in FIG. 4 to be discussed later, the fourth lubrication oil passage 64) is connected to the branched oil passage 45, the second hydraulic pump 22 may be driven so that oil discharged from the second hydraulic pump 22 is supplied to the different oil passage without being supplied to the lubrication branched oil passage 53.

As described above, in the case where the decoupling engagement device C0 is controlled to the slipping engagement state, the valve control device 14 performs control so as to establish a state (first supply state) in which oil discharged from the first hydraulic pump 21 is supplied to both the first engagement oil passage 51 and the second engagement oil passage 52 and oil discharged from at least the second hydraulic pump 22, among the first hydraulic pump 21 and the second hydraulic pump 22, is supplied to the first lubrication oil passage 61. In the embodiment, in the first supply state, the first lubrication oil passage 61 is supplied with both oil discharged from the first hydraulic pump 21 and oil discharged from the second hydraulic pump 22. In the embodiment, as discussed above, the decoupling engagement device C0 is controlled to the slipping engagement state in the case where the vehicle is started using only torque of the internal combustion engine E. In this event, rotation of the input shaft I is transferred to the output shafts O. That is, the supply state control section 13 which includes the valve control device 14 is configured to establish the first supply state in the case where the decoupling engagement device C0 is controlled to the slipping engagement state while the internal combustion engine E is rotating, in other words, rotation of the input shaft I is transferred to the output shafts O by controlling the decoupling engagement device C0 to the slipping engagement state.

Figure 3:
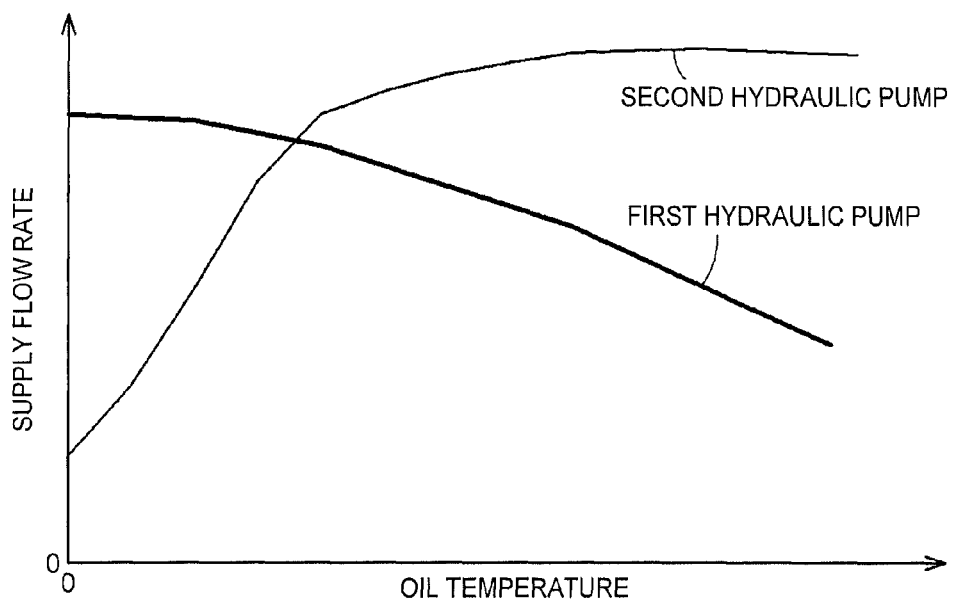
FIG. 3 is a graph illustrating an example of the relationship between the oil temperature and the supply flow rate for a first hydraulic pump and a second hydraulic pump.

In general, as the oil temperature becomes higher, the viscosity of oil becomes lower, which makes it more likely that oil leaks inside a pump, inside a valve, at a connection portion of an oil passage, or the like. Therefore, as schematically illustrated in FIG. 3, the supply flow rate of oil that can be supplied from the first hydraulic pump 21 to the vehicle drive device 1 tends to become lower as the oil temperature becomes higher. In the embodiment, in contrast, the second hydraulic pump 22 is an electric pump driven by the electric motor 23. In the embodiment, a rotary electric machine that is smaller in size than the rotary electric machine MG is used as the electric motor 23. Therefore, the electric motor 23 has a small maximum value of torque that can be output continuously for a long time compared to the rotary electric machine MG and the internal combustion engine E. That is, the electric motor 23 is a high-speed low-torque rotary electric machine that can output low torque but that has a high maximum rotational speed compared to the rotary electric machine MG and the internal combustion engine E. Thus, the second hydraulic pump 22 has characteristics that provide a low discharge pressure but that secure a high supply flow rate compared to the first hydraulic pump 21. Therefore, for the second hydraulic pump 22, it is easy to secure a supply flow rate by increasing the rotational speed of the pump rotor even in a state in which the oil temperature is high and the viscosity of oil is low. In a state in which the oil temperature is low and the viscosity of oil is high, on the other hand, it is difficult to secure a supply flow rate because drive torque of the pump rotor is insufficient. That is, as schematically illustrated in FIG. 3, the supply flow rate of oil that can be supplied from the second hydraulic pump 22 to the vehicle drive device 1 tends to become lower as the oil temperature becomes lower. In view of such tendencies, the state of the branched control valve portion 84 may be basically switched into a state in which the branched oil passage 45 and the lubrication branched oil passage 53 communicate with each other in the case where the decoupling engagement device C0 is controlled to the slipping engagement state, and the state of the branched control valve portion 84 may be switched into a state in which the branched oil passage 45 and the lubrication branched oil passage 53 do not communicate with each other to stop the second hydraulic pump 22 in the case where the oil temperature becomes lower than a threshold determined in advance.

The discharge capacity of the first hydraulic pump 21 is set to be higher than the discharge capacity of the second hydraulic pump 22. Therefore, in the case where both the first hydraulic pump 21 and the second hydraulic pump 22 are driven, the second check valve 32 is basically brought into a closed state, and oil discharged from the second hydraulic pump 22 is basically supplied to only the branched oil passage 45 without being supplied to the merged oil passage 43. That is, in the case where the first hydraulic pump 21 is driven, oil discharged from the first hydraulic pump 21 is supplied to both the first engagement oil passage 51 and the second engagement oil passage 52 irrespective of the operating state of the second hydraulic pump 22. In the case where the decoupling engagement device C0 is controlled to the disengaged state so that torque of the rotary electric machine MG is transferred to the output shafts O (that is, in the case where the electric travel mode is executed), for example, the first hydraulic pump 21 is driven by the rotary electric machine MG. Consequently, the second check valve 32 is brought into a closed state. In addition, in order to transfer output torque of the rotary electric machine MG to the output shafts O by controlling the decoupling engagement device C0 to the disengaged state, the supply state control section 13 establishes a state in which no oil is supplied to the first engagement oil passage 51 through the first supply control valve 55 and a state in which oil discharged from the first hydraulic pump 21 is supplied to the second engagement oil passage 52 through the second supply control valve 56. That is, in the embodiment, the supply state control section 13 is configured to establish a state (second supply state) in which oil discharged from the first hydraulic pump 21 is supplied to the second engagement oil passage 52 and no oil is supplied to the first engagement oil passage 51 in the case where the decoupling engagement device C0 is controlled to the disengaged state so that torque of the rotary electric machine MG is transferred to the output shafts O.

In a state in which neither the internal combustion engine E nor the rotary electric machine MG is rotating, the first hydraulic pump 21 is not driven. Therefore, in order to supply oil to the vehicle drive device 1 in this state, it is necessary to drive the second hydraulic pump 22. Thus, in order to drive the second hydraulic pump 22 with the first hydraulic pump 21 not driven, the valve control device 14 controls the state of the branched control valve portion 84 so as to switch to a state in which the branched oil passage 45 and the lubrication branched oil passage 53 do not communicate with each other irrespective of the control state of the decoupling engagement device C0. In this case, oil discharged from the second hydraulic pump 22 can be supplied to both the first engagement oil passage 51 and the second engagement oil passage 52 via the merged oil passage 43 and the first supply control valve 55 and the second supply control valve 56, respectively. Thus, in the case where the vehicle is started in the electric travel mode, for example, the second hydraulic pump 22 is actuated and the state of the branched control valve portion 84 is switched into a state in which the branched oil passage 45 and the lubrication branched oil passage 53 do not communicate with each other so that oil discharged from the second hydraulic pump 22 is supplied to the second engagement oil passage 52 before the discharge pressure of the first hydraulic pump 21 is increased to a certain degree. At this time, the first check valve 31 is brought into a closed state by a hydraulic pressure from the second hydraulic pump 22. After that, when the discharge pressure of the first hydraulic pump 21 becomes higher than the discharge pressure of the second hydraulic pump 22 as the rotational speed of the rotary electric machine MG is increased, the first check valve 31 is brought into an open state and the second check valve 32 is brought into a closed state to establish the second supply state discussed above.

1-3. Specific Example of Oil Supply Device

Figure 4:
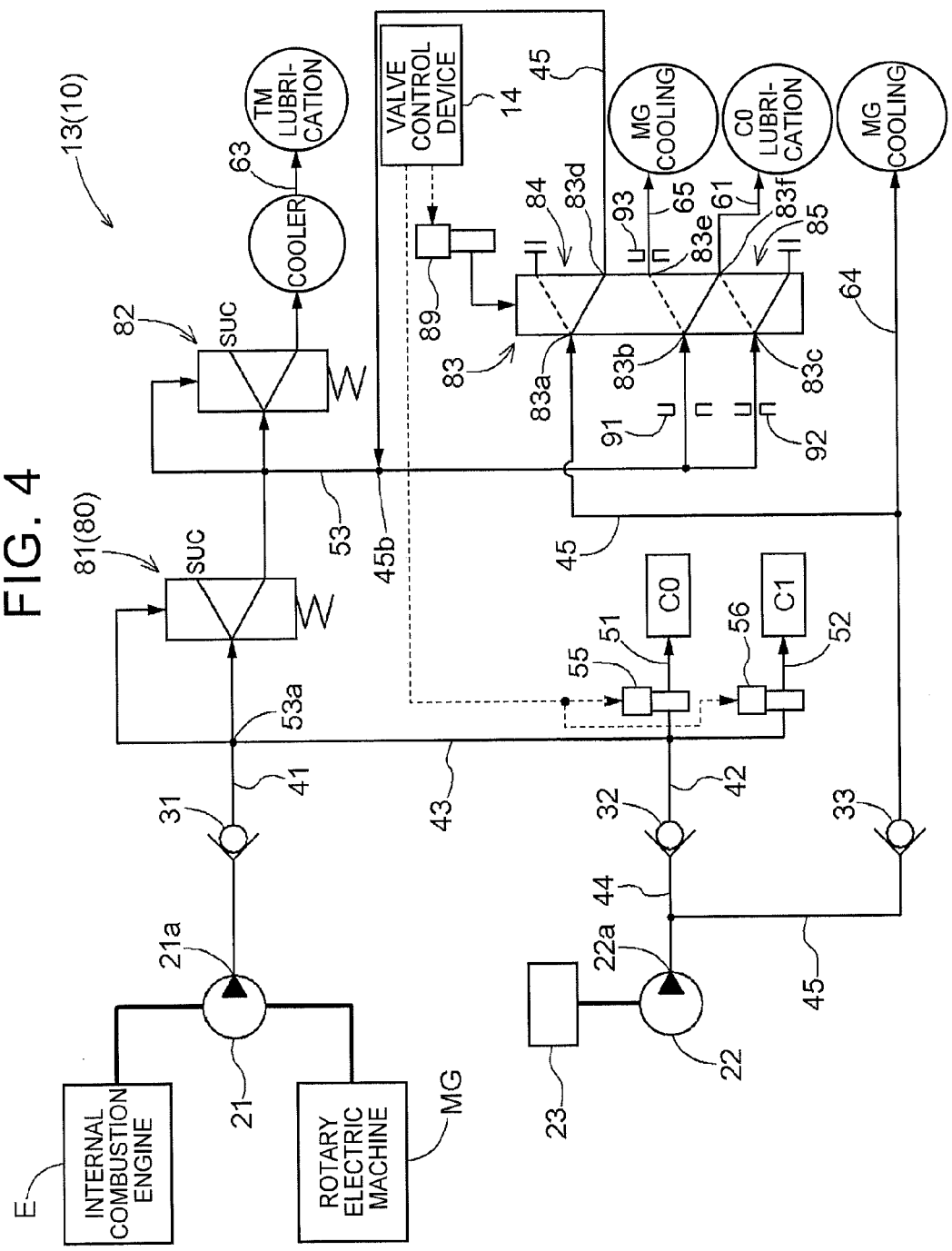
FIG. 4 is a schematic diagram illustrating a specific example of the oil supply device according to the first embodiment of the present disclosure.

Next, a specific example of the oil supply device 10 configured as described above will be described with reference to FIG. 4. In the specific example, as illustrated in FIG. 4, the communication state control valve 83 is a single switching valve that integrally includes the branched control valve portion 84 and the lubrication control valve portion 85. The supply state control section 13 includes a control valve 89 (in the example of FIG. 4, a solenoid valve) controlled by the valve control device 14, and the state of the communication state control valve 83 is switched in accordance with a signal hydraulic pressure input from the control valve 89.

Specifically, the communication state control valve 83 includes: a first input port 83$a$ connected to a portion of the branched oil passage 45 provided upstream of the communication state control valve 83; a second input port 83$b$ and a third input port 83$c$ connected to the lubrication branched oil passage 53; a first output port 83$d$ connected to a portion of the branched oil passage 45 provided downstream of the communication state control valve 83; a second output port 83$e$ connected to the fifth lubrication oil passage 65; a third output port 83$f$ connected to the first lubrication oil passage 61; and a valve element (spool) that slides inside a sleeve in which such ports are formed. Switching is performed between a first switching state indicated by the solid lines in FIG. 4, in which the first input port 83$a$ and the first output port 83$d$ communicate with each other and the second input port 83$b$ and the third output port 83$f$ communicate with each other, and a second switching state indicated by the broken lines in FIG. 4, in which the second input port 83$b$ and the second output port 83$e$ communicate with each other and the third input port 83$c$ and the third output port 83$f$ communicate with each other, in accordance with the position of the valve element which is controlled by the control valve 89.

The first switching state corresponds to a state in which each of the branched control valve portion 84 and the lubrication control valve portion 85 is switched into the state indicated by the solid line in FIG. 2. In the first switching state, the branched oil passage 45 and the lubrication branched oil passage 53 communicate with each other, and the flow rate of oil that flows from the lubrication branched oil passage 53 to the first lubrication oil passage 61 is the first flow rate. On the other hand, the second switching state corresponds to a state in which each of the branched control valve portion 84 and the lubrication control valve portion 85 is switched into the state indicated by the broken line in FIG. 2. In the second switching state, the branched oil passage 45 and the lubrication branched oil passage 53 do not communicate with each other, and the flow rate of oil that flows from the lubrication branched oil passage 53 to the first lubrication oil passage 61 is the second flow rate. In the specific example, the second flow rate is set to a value that is larger than zero. Specifically, the second flow rate is set to a value that is smaller than the first flow rate by providing a first orifice 91 at a portion of the lubrication branched oil passage 53 connected to the second input port 83*b* and providing a second orifice 92, which is smaller in diameter (oil passage diameter) than the first orifice 91, at a portion of the lubrication branched oil passage 53 connected to the third input port 83*c*.

In the specific example, in addition, the second input port 83*b* and the second output port 83*e* communicate with each other in the second switching state, and therefore oil is supplied from the lubrication branched oil passage 53 to the fifth lubrication oil passage 65. A third orifice 93 that sets the supply flow rate in this event is provided at a portion of the fifth lubrication oil passage 65 connected to the second output port 83*e*.

Control of the state of the communication state control valve 83 performed by the valve control device 14 is the same as the case of FIG. 2, and therefore is not described. In the specific example, the state of the branched control valve portion 84 and the state of the lubrication control valve portion 85 are switched in conjunction with each other. In the specific example, unlike the case of FIG. 2, oil discharged from the first hydraulic pump 21 or the second hydraulic pump 22 is supplied to the first lubrication oil passage 61 even in the case where the decoupling engagement device C0 is controlled to the direct engagement state or the disengaged state (that is, switching is performed to the second switching state). In the specific example, in addition, a third check valve 33 that restricts a flow of oil toward the upstream side is provided in the branched oil passage 45, and the fourth lubrication oil passage 64 is connected to the branched oil passage 45. Therefore, oil can be supplied to the fourth lubrication oil passage 64 by driving the second hydraulic pump 22 irrespective of the state of the communication state control valve 83, which makes it possible to supply oil to the rotary electric machine MG.

In the specific example, a first pressure regulation valve 81 is provided as the pressure regulation device 80. Specifically, the first pressure regulation valve 81 is a valve that regulates a hydraulic pressure in the merged oil passage 43 to the line pressure, and provided in the lubrication branched oil passage 53 between the branched portion 53*a* and the connection portion 45*b*. In the specific example, in addition, a second pressure regulation valve 82 that regulates a hydraulic pressure of extra oil from the first pressure regulation valve 81 to a set hydraulic pressure that is lower than the line pressure is provided. The second pressure regulation valve 82 is a valve that regulates a hydraulic pressure in a portion of the lubrication branched oil passage 53 provided downstream of the first pressure regulation valve 81 to the set hydraulic pressure. In the specific example, the second pressure regulation valve 82 is configured such that extra oil from the second pressure regulation valve 82 is supplied to the third lubrication oil passage 63 via a cooler. In the specific example, in addition, the first pressure regulation valve 81 and the second pressure regulation valve 82 are configured so as to discharge drain oil that results from pressure regulation to a suction oil passage. The suction oil passage is an oil passage that returns oil to a portion of an intake oil passage for the first hydraulic pump 21 or the second hydraulic pump 22 provided downstream of a strainer.

In the specific example, with the configuration described above, the branched oil passage 45 is connected to a portion of the lubrication branched oil passage 53 subjected to pressure regulation performed by the second pressure regulation valve 82. Hence, the discharge pressure required from the second hydraulic pump 22 when oil discharged from the second hydraulic pump 22 is supplied to the lubrication branched oil passage 53 via the branched oil passage 45 can be suppressed to be low compared to a case where the branched oil passage 45 is connected to a portion subjected to pressure regulation performed by the first pressure regulation valve 81. As a result, a large amount of oil can be easily supplied from the second hydraulic pump 22 when the communication state control valve 83 is switched into the first switching state so that the first lubrication oil passage 61 is supplied with both oil discharged from the first hydraulic pump 21 and oil discharged from the second hydraulic pump 22.

2. Second Embodiment

An oil supply device according to a second embodiment of the present disclosure will be described with reference to FIG. 5. The embodiment is different from the first embodiment described above in that the supply state control section 13 does not include the lubrication branched oil passage 53. Differences from the first embodiment described above will be mainly described below. The same points as those in the first embodiment described above will not be specifically described.

Figure 5:
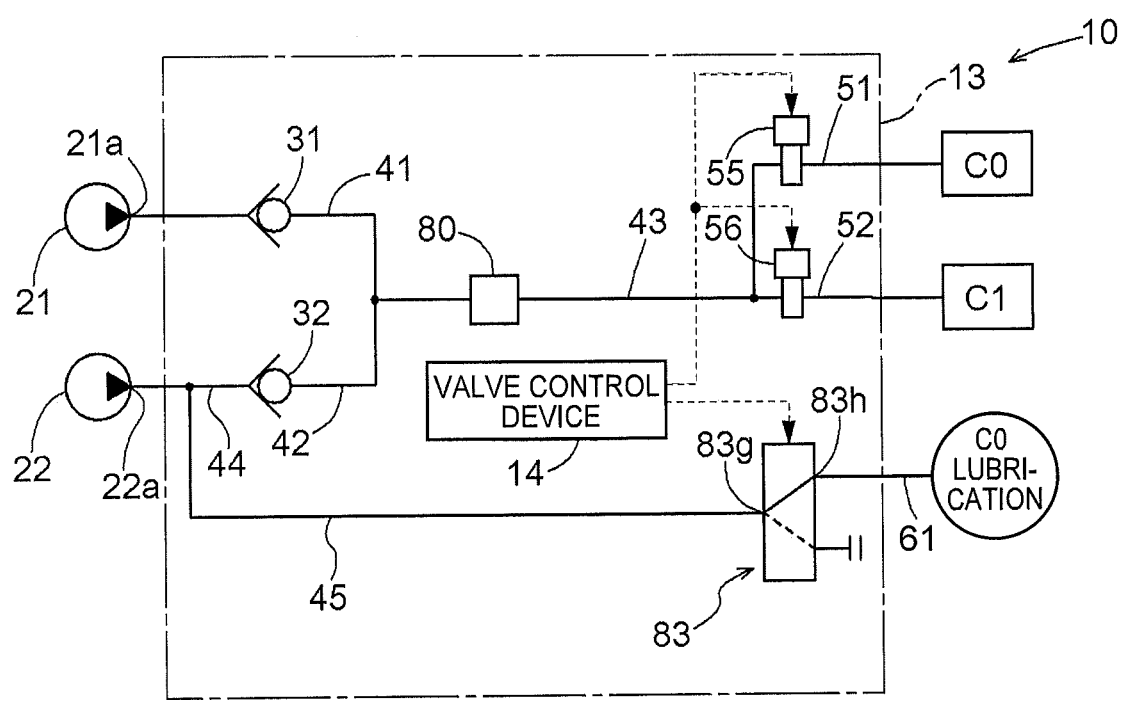
FIG. 5 is a schematic diagram illustrating a schematic configuration of an oil supply device according to a second embodiment of the present disclosure.

In the embodiment, as illustrated in FIG. 5, the branched oil passage 45 is connected to the first lubrication oil passage 61 not via an oil passage (e.g. the merged oil passage 43) provided downstream of the second check valve 32. In the embodiment, the communication state control valve 83 performs control so as to switch between a state in which the branched oil passage 45 and the first lubrication oil passage 61 communicate with each other and a state in which the branched oil passage 45 and the first lubrication oil passage 61 do not communicate with each other. Specifically, the communication state control valve 83 is provided at a portion of connection between the branched oil passage 45 and the first lubrication oil passage 61. The communication state control valve 83 includes an input port 83*g* connected to the branched oil passage 45, an output port 83*h* connected to the first lubrication oil passage 61, and a valve element (spool) that slides inside a sleeve in which such ports are formed. Switching is performed between a state in which the input port 83*g* and the output port 83*h* communicate with each other indicated by the solid line in FIG. 5 and a state in which the input port 83*g* and the output port 83*h* do not communicate with each other indicated by the broken line in FIG. 5 in accordance with the position of the valve element which is controlled by the valve control device 14. In the state in which the input port 83*g* and the output port 83*h* communicate with each other, the branched oil passage 45 and the first lubrication oil passage 61 communicate with each other. In the state in which the input port 83*g* and the output port 83*h* do not communicate with each other, the branched oil passage 45 and the first lubrication oil passage 61 do not communicate with each other.

The valve control device 14 controls the state of the communication state control valve 83 so as to switch to a state in which the branched oil passage 45 and the first lubrication oil passage 61 communicate with each other in the case where the decoupling engagement device C0 is controlled to the slipping engagement state. In this event, the second hydraulic pump 22 is also driven so that oil discharged from the second hydraulic pump 22 is supplied to the first lubrication oil passage 61 via the branched oil passage 45. In this event, unlike the first embodiment described above, oil discharged from the first hydraulic pump 21 is not supplied to the first lubrication oil passage 61. That is, in the embodiment, in the first supply state, the first lubrication oil passage 61 is supplied with only oil discharged from the second hydraulic pump 22, among oil discharged from the first hydraulic pump 21 and oil discharged from the second hydraulic pump 22. Although not illustrated, the first lubrication oil passage 61 may be provided with a switching valve that performs control so as to switch the flow rate of oil that flows downstream between a first flow rate and a second flow rate that is less than the first flow rate, for example.

On the other hand, the valve control device 14 controls the state of the communication state control valve 83 so as to switch to a state in which the branched oil passage 45 and the first lubrication oil passage 61 do not communicate with each other in the case where the decoupling engagement device C0 is controlled to the direct engagement state or the disengaged state. In this event, the second hydraulic pump 22 is basically stopped. In addition, the valve control device 14 basically controls the state of the communication state control valve 83 so as to switch to a state in which the branched oil passage 45 and the first lubrication oil passage 61 do not communicate with each other in the case where the second hydraulic pump 22 is driven with the first hydraulic pump 21 not driven. In this case, oil discharged from the second hydraulic pump 22 is supplied to both the first engagement oil passage 51 and the second engagement oil passage 52 via the merged oil passage 43 and the first supply control valve 55 and the second supply control valve 56, respectively, without being supplied to the first lubrication oil passage 61.

3. Third Embodiment

An oil supply device according to a third embodiment of the present disclosure will be described with reference to FIG. 6. In the first and second embodiments described above, it is basically assumed that only the decoupling engagement device C0 is brought into the slipping engagement state. In the embodiment, however, the vehicle drive device 1 is configured such that one or both of the decoupling engagement device C0 and the shifting engagement device C1 are controlled to the slipping engagement state so that rotation of the input shaft I can be transferred to the output shafts O in accordance with the situation. Therefore, the oil supply device 10 according to the embodiment is configured to be able to supply a sufficient amount of lubricating oil to both the decoupling engagement device C0 and the shifting engagement device C1. In the first embodiment described above, the branched oil passage 45 is connected to the first lubrication oil passage 61 via the lubrication branched oil passage 53. In the embodiment, however, the branched oil passage 45 is directly connected to the first lubrication oil passage 61 and a second lubrication oil passage 62 not via the lubrication branched oil passage 53. Differences from the specific example illustrated in FIG. 4 according to the first embodiment discussed above will be mainly described below. The same points as those in the first embodiment described above will not be specifically described.

Figure 6:
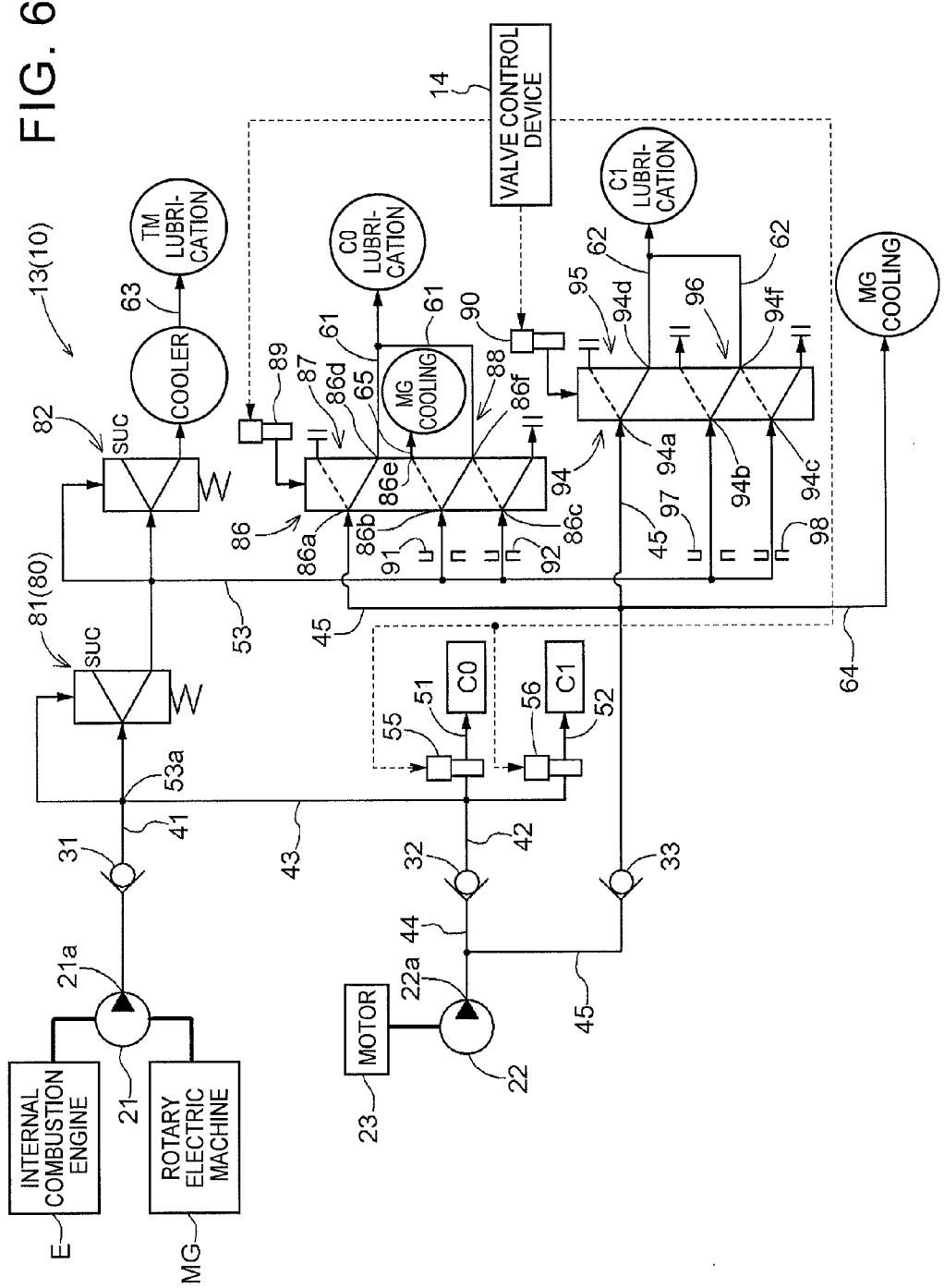
FIG. 6 is a schematic diagram illustrating a specific example of an oil supply device according to a third embodiment of the present disclosure.

In the embodiment, as illustrated in FIG. 6, the oil supply device 10 includes a second lubrication oil passage 62 that supplies oil for lubrication to the shifting engagement device C1 in addition to the first lubrication oil passage 61 which supplies oil for lubrication to the decoupling engagement device C0. Accordingly, the supply state control section 13 includes a first communication state control valve 86 that controls supply of oil to the first lubrication oil passage 61, and a second communication state control valve 94 that controls supply of oil to the second lubrication oil passage 62. In the embodiment, both the first lubrication oil passage 61 and the second lubrication oil passage 62 correspond to the "lubrication oil passage" according to the present disclosure, and both the first communication state control valve 86 and the second communication state control valve 94 correspond to the "communication state control valve" according to the present disclosure.

In the embodiment, the lubrication branched oil passage 53 is branched from the merged oil passage 43 at the branched portion 53a to be thereafter connected to each of the first lubrication oil passage 61 and the second lubrication oil passage 62. That is, the lubrication branched oil passage 53 is branched at a location on the downstream side into an oil passage connected to the first lubrication oil passage 61 via the first communication state control valve 86 and an oil passage connected to the second lubrication oil passage 62 via the second communication state control valve 94, the oil passages extending in parallel with each other. Similarly, the branched oil passage 45 is also branched from the connection oil passage 44 to be thereafter connected to each of the first lubrication oil passage 61 and the second lubrication oil passage 62. That is, the branched oil passage 45 is branched at a location on the downstream side into an oil passage connected to the first lubrication oil passage 61 via the first communication state control valve 86 and an oil passage connected to the second lubrication oil passage 62 via the second communication state control valve 94, the oil passages extending in parallel with each other. In the embodiment, the branched oil passage 45 is branched from the connection oil passage 44 to be thereafter connected to each of the first lubrication oil passage 61 and the second lubrication oil passage 62 not via the lubrication branched oil passage 53. The valve control device 14 controls the state of the first communication state control valve 86, the second communication state control valve 94, the first supply control valve 55, and the second supply control valve 56.

The first communication state control valve 86 is a valve that controls the state of supply of oil to the first lubrication oil passage 61 which is an oil passage for lubrication of the decoupling engagement device C0. The first communication state control valve 86 includes a branched control valve portion 87 that controls the state of communication between the branched oil passage 45 and the first lubrication oil passage 61 and a lubrication control valve portion 88 that controls the state of communication between the lubrication branched oil passage 53 and the first lubrication oil passage 61. In the example illustrated in FIG. 6, the first communication state control valve 86 is a single switching valve that integrally includes the branched control valve portion 87 and the lubrication control valve portion 88. The branched control valve portion 87 performs control so as to switch between a state in which the branched oil passage 45 and the first lubrication oil passage 61 communicate with each other and a state in which the branched oil passage 45 and the first lubrication oil passage 61 do not communicate with each other. The lubrication control valve portion 88 performs control so as to switch the flow rate of oil that flows from the lubrication branched oil passage 53 to the first lubrication oil passage 61 between a first flow rate and a second flow rate that is less than the first flow rate. The state of the first communication state control valve 86 is switched in accordance with a signal hydraulic pressure input from the control valve 89 which is controlled by the valve control device 14.

Specifically, the first communication state control valve 86 includes: a first input port 86a connected to a portion of the branched oil passage 45 provided upstream of the first communication state control valve 86; a second input port 86b and a third input port 86c connected to the lubrication branched oil passage 53; a first output port 86d connected to the first lubrication oil passage 61; a second output port 86e connected to the fifth lubrication oil passage 65; a third output port 86f connected to the first lubrication oil passage 61; and a valve element (spool) that slides inside a sleeve in which such ports are formed. Switching is performed between a first switching state indicated by the solid lines in FIG. 6, in which the first input port 86a and the first output port 86d communicate with each other and the second input port 86b and the third output port 86f communicate with each other, and a second switching state indicated by the broken lines in FIG. 6, in which the second input port 86b and the second output port 86e communicate with each other and the third input port 86c and the third output port 86f communicate with each other, in accordance with the position of the valve element which is controlled by the control valve 89.

In the first switching state, the branched oil passage 45 and the first lubrication oil passage 61 communicate with each other, and the flow rate of oil that flows from the lubrication branched oil passage 53 to the first lubrication oil passage 61 is the first flow rate. In the second switching state, on the other hand, the branched oil passage 45 and the first lubrication oil passage 61 do not communicate with each other, and the flow rate of oil that flows from the lubrication branched oil passage 53 to the first lubrication oil passage 61 is the second flow rate. As in the example illustrated in FIG. 4, the second flow rate is set to be lower than the first flow rate by setting the second orifice 92 to be smaller in diameter (oil passage diameter) than the first orifice 91.

The second communication state control valve 94 is a valve that controls the state of supply of oil to the second lubrication oil passage 62 which is an oil passage for lubrication of the shifting engagement device C1. The second communication state control valve 94 includes a branched control valve portion 95 that controls the state of communication between the branched oil passage 45 and the second lubrication oil passage 62 and a lubrication control valve portion 96 that controls the state of communication between the lubrication branched oil passage 53 and the second lubrication oil passage 62. In the example illustrated in FIG. 6, the second communication state control valve 94 is a single switching valve that integrally includes the branched control valve portion 95 and the lubrication control valve portion 96. The branched control valve portion 95 performs control so as to switch between a state in which the branched oil passage 45 and the second lubrication oil passage 62 communicate with each other and a state in which the branched oil passage 45 and the second lubrication oil passage 62 do not communicate with each other. The lubrication control valve portion 96 performs control so as to switch the flow rate of oil that flows from the lubrication branched oil passage 53 to the second lubrication oil passage 62 between a first flow rate and a second flow rate that is less than the first flow rate. The state of the second communication state control valve 94 is switched in accordance with a signal hydraulic pressure input from a control valve 90 which is controlled by the valve control device 14.

Specifically, the second communication state control valve 94 includes: a first input port 94a connected to a portion of the branched oil passage 45 provided upstream of the second communication state control valve 94; a second input port 94b and a third input port 94c connected to the lubrication branched oil passage 53; a first output port 94d connected to the second lubrication oil passage 62; a second output port 94f connected to the second lubrication oil passage 62; and a valve element (spool) that slides inside a sleeve in which such ports are formed. Switching is performed between a first switching state indicated by the solid lines in FIG. 6, in which the first input port 94a and the first output port 94d communicate with each other and the second input port 94b and the second output port 94f communicate with each other, and a second switching state indicated by the broken lines in FIG. 6, in which the third input port 94c and the second output port 94f communicate with each other, in accordance with the position of the valve element which is controlled by the control valve 90.

In the first switching state, the branched oil passage 45 and the second lubrication oil passage 62 communicate with each other, and the flow rate of oil that flows from the lubrication branched oil passage 53 to the second lubrication oil passage 62 is the first flow rate. In the second switching state, on the other hand, the branched oil passage 45 and the second lubrication oil passage 62 do not communicate with each other, and the flow rate of oil that flows from the lubrication branched oil passage 53 to the second lubrication oil passage 62 is the second flow rate. Also for the second communication state control valve 94, as for the first communication state control valve 86, the second flow rate is set to be lower than the first flow rate by setting a second orifice 98 to be smaller in diameter (oil passage diameter) than a first orifice 97.

The valve control device 14 controls the state of the first communication state control valve 86 and the second communication state control valve 94 in accordance with the control state of each of the decoupling engagement device C0 and the shifting engagement device C1.

In the embodiment, the valve control device 14 switches the first communication state control valve 86 into the first switching state indicated by the solid lines in FIG. 6 in the case where the decoupling engagement device C0 is controlled to the slipping engagement state. Consequently, the lubrication control valve portion 88 of the first communication state control valve 86 is switched into a state in which the flow rate of oil that flows from the lubrication branched oil passage 53 to the first lubrication oil passage 61 is the first flow rate. Thus, the decoupling engagement device C0 can be appropriately cooled by supplying a large amount of oil from the lubrication branched oil passage 53 to the first lubrication oil passage 61 in the case where the decoupling engagement device C0 generates a large amount of heat. In the case where the decoupling engagement device C0 is controlled to the slipping engagement state, at least one of the internal combustion engine E and the rotary electric machine MG is rotating, and therefore the first hydraulic pump 21 is driven. Therefore, oil discharged from the first hydraulic pump 21 is supplied to the first lubrication oil passage 61 via the merged oil passage 43 and the lubrication branched oil passage 53.

In the embodiment, in addition, the branched control valve portion 87 establishes a state in which the branched oil passage 45 and the first lubrication oil passage 61 communicate each other by bringing the first communication state control valve 86 into the first switching state. In this event, the second hydraulic pump 22 is also driven so that oil discharged from the second hydraulic pump 22 is supplied to the first lubrication oil passage 61 via the branched oil passage 45. Hence, oil discharged from the second hydraulic pump 22 can be supplied to the first lubrication oil passage 61 in addition to oil discharged from the first hydraulic pump 21 in the case where the decoupling engagement device C0 generates a large amount of heat. Consequently, each of the first hydraulic pump 21 and the second hydraulic pump 22 can be reduced in size while appropriately securing the cooling performance of the decoupling engagement device C0.

On the other hand, the valve control device 14 switches the first communication state control valve 86 into the second switching state indicated by the broken lines in FIG. 6 in the case where the decoupling engagement device C0 is controlled to the direct engagement state or the disengaged state. Consequently, the lubrication control valve portion 88 of the first communication state control valve 86 is switched into a state in which the flow rate of oil that flows from the lubrication branched oil passage 53 to the first lubrication oil passage 61 is the second flow rate. Thus, drag torque generated by the stirring resistance of oil in the decoupling engagement device C0 can be suppressed by reducing the amount of oil supplied from the lubrication branched oil passage 53 to the first lubrication oil passage 61 in the case where the decoupling engagement device C0 generates a small amount of heat. In the embodiment, in addition, the branched control valve portion 87 establishes a state in which the branched oil passage 45 and the first lubrication oil passage 61 do not communicate each other by bringing the first communication state control valve 86 into the second switching state. In this state, oil discharged from the second hydraulic pump 22 is supplied to the second lubrication oil passage 62 in accordance with the state of the second communication state control valve 94, and supplied to the rotary electric machine MG via the fourth lubrication oil passage 64.

As in the case of the first communication state control valve 86 and the decoupling engagement device C0, the valve control device 14 switches the second communication state control valve 94 into the first switching state indicated by the solid lines in FIG. 6 in the case where the shifting engagement device C1 is controlled to the slipping engagement state. Consequently, the lubrication control valve portion 96 of the second communication state control valve 94 is switched into a state in which the flow rate of oil that flows from the lubrication branched oil passage 53 to the second lubrication oil passage 62 is the first flow rate. Thus, the shifting engagement device C1 can be appropriately cooled by supplying a large amount of oil from the lubrication branched oil passage 53 to the second lubrication oil passage 62 in the case where the shifting engagement device C1 generates a large amount of heat. In the case where the shifting engagement device C1 is controlled to the slipping engagement state, at least one of the internal combustion engine E and the rotary electric machine MG is rotating, and therefore the first hydraulic pump 21 is driven. Therefore, oil discharged from the first hydraulic pump 21 is supplied to the second lubrication oil passage 62 via the merged oil passage 43 and the lubrication branched oil passage 53.

In the embodiment, in addition, the branched control valve portion 95 establishes a state in which the branched oil passage 45 and the second lubrication oil passage 62 communicate each other by bringing the second communication state control valve 94 into the first switching state. In this event, the second hydraulic pump 22 is also driven so that oil discharged from the second hydraulic pump 22 is supplied to the second lubrication oil passage 62 via the branched oil passage 45. Hence, oil discharged from the second hydraulic pump 22 can be supplied to the second lubrication oil passage 62 in addition to oil discharged from the first hydraulic pump 21 in the case where the shifting engagement device C1 generates a large amount of heat. Consequently, each of the first hydraulic pump 21 and the second hydraulic pump 22 can be reduced in size while appropriately securing the cooling performance of the shifting engagement device C1.

On the other hand, the valve control device 14 switches the second communication state control valve 94 into the second switching state indicated by the broken lines in FIG. 6 in the case where the shifting engagement device C1 is controlled to the direct engagement state or the disengaged state. Consequently, the lubrication control valve portion 96 of the second communication state control valve 94 is switched into a state in which the flow rate of oil that flows from the lubrication branched oil passage 53 to the second lubrication oil passage 62 is the second flow rate. Thus, drag torque generated by the stirring resistance of oil in the shifting engagement device C1 can be suppressed by reducing the amount of oil supplied from the lubrication branched oil passage 53 to the second lubrication oil passage 62 in the case where the shifting engagement device C1 generates a small amount of heat. In the embodiment, in addition, the branched control valve portion 95 establishes a state in which the branched oil passage 45 and the second lubrication oil passage 62 do not communicate each other by bringing the second communication state control valve 94 into the second switching state. In this state, oil discharged from the second hydraulic pump 22 is supplied to the first lubrication oil passage 61 in accordance with the state of the first communication state control valve 86, and supplied to the rotary electric machine MG via the fourth lubrication oil passage 64.

In addition, oil discharged from the first hydraulic pump 21 is also supplied to the first supply control valve 55 and the second supply control valve 56 via the merged oil passage 43. In the case where the decoupling engagement device C0 is controlled to the slipping engagement state or the direct engagement state and the shifting engagement device C1 is controlled to the direct engagement state or the slipping engagement state, oil discharged from the first hydraulic pump 21 is supplied to both the first engagement oil passage 51 and the second engagement oil passage 52 via the first supply control valve 55 and the second supply control valve 56, respectively. In the case where the decoupling engagement device C0 is controlled to the disengaged state and the shifting engagement device C1 is controlled to the direct engagement state or the slipping engagement state, oil discharged from the first hydraulic pump 21 is supplied to only the second engagement oil passage 52 via the second supply control valve 56.

As described above, in the case where at least one of the decoupling engagement device C0 and the shifting engagement device C1 is controlled to the slipping engagement state, oil discharged from the first hydraulic pump 21 is supplied to both the first engagement oil passage 51 and the second engagement oil passage 52 under control by the valve control device 14. In the case where at least one of the decoupling engagement device C0 and the shifting engagement device C1 is controlled to the slipping engagement state, in addition, a state (first supply state) in which oil discharged from at least the second hydraulic pump 22 (here, both the first hydraulic pump 21 and the second hydraulic pump 22) is supplied to an oil passage, among the first lubrication oil passage 61 and the second lubrication oil passage 62, that corresponds to an engagement device controlled to the slipping engagement state. In the embodiment, at least one of the decoupling engagement device C0 and the shifting engagement device C1 is controlled to the slipping engagement state in the case where the vehicle is started using torque of the internal combustion engine E. In this event, rotation of the input shaft I is transferred to the output shafts O. That is, the supply state control section 13 which includes the valve control device 14 is configured to establish the first supply state in the case where at least one of the decoupling engagement device C0 and the shifting engagement device C1 is controlled to the slipping engagement state while the internal combustion engine E is rotating, in other words, rotation of the input shaft I is transferred to the output shafts O by controlling at least one of the decoupling engagement device C0 and the shifting engagement device C1 to the slipping engagement state.

As described above, the discharge capacity of the first hydraulic pump 21 is set to be higher than the discharge capacity of the second hydraulic pump 22. Therefore, the second check valve 32 is basically brought into a closed state in the case where the first hydraulic pump 21 is driven. That is, in the case where the first hydraulic pump 21 is driven, oil discharged from the first hydraulic pump 21 is supplied to both the first supply control valve 55 and the second supply control valve 56 irrespective of the operating state of the second hydraulic pump 22. In the case where the decoupling engagement device C0 is controlled to the disengaged state so that torque of the rotary electric machine MG is transferred to the output shafts O (that is, in the case where the electric travel mode is executed), for example, the first hydraulic pump 21 is driven by the rotary electric machine MG. Consequently, the second check valve 32 is brought into a closed state. In addition, in order to transfer output torque of the rotary electric machine MG to the output shafts O by controlling the decoupling engagement device C0 to the disengaged state and controlling the shifting engagement device C1 to the direct engagement state, the supply state control section 13 establishes a state in which no oil is supplied to the first engagement oil passage 51 through the first supply control valve 55 and a state in which oil discharged from the first hydraulic pump 21 is supplied to the second engagement oil passage 52 through the second supply control valve 56. That is, in the embodiment, the supply state control section 13 is configured to establish a state (second supply state) in which oil discharged from the first hydraulic pump 21 is supplied to the second engagement oil passage 52 and no oil is supplied to the first engagement oil passage 51 in the case where the decoupling engagement device C0 is controlled to the disengaged state so that torque of the rotary electric machine MG is transferred to the output shafts O.

In the configuration according to the embodiment, in the case where one or both of the decoupling engagement device C0 and the shifting engagement device C1 are controlled to the slipping engagement state, the engagement device controlled to the slipping engagement state can be supplied with both oil discharged from the first hydraulic pump and oil discharged from the second hydraulic pump. Thus, the engagement device which is controlled to the slipping engagement state and generates a large amount of heat can be appropriately lubricated and cooled. On the other hand, in the case where one or both of the decoupling engagement device C0 and the shifting engagement device C1 are controlled to a state other than the slipping engagement state, that is, the disengaged state or the direct engagement state, the amount of oil to be supplied to such an engagement device can be suppressed to be small. Thus, it is possible to suppress supply of a large amount of oil to an engagement device that generates a small amount of heat, and to suppress drag torque generated by the stirring resistance of oil in such an engagement device.

In addition, in the embodiment, unlike the first embodiment described above, the branched oil passage 45 is branched from the connection oil passage 44 to be thereafter connected to each of the first lubrication oil passage 61 and the second lubrication oil passage 62 not via the lubrication branched oil passage 53. That is, the branched oil passage 45 directly communicates with the first lubrication oil passage 61 in the case where the first communication state control valve 86 is in the first switching state, and directly communicates with the second lubrication oil passage 62 in the case where the second communication state control valve 94 is in the first switching state. In the configuration in which the branched oil passage 45 is connected to the lubrication branched oil passage 53 as in the first embodiment described above, on the other hand, it is necessary for the second hydraulic pump 22 to generate a hydraulic pressure that is equal to or more than a hydraulic pressure (here, the hydraulic pressure set by the second pressure regulation valve 82) in the lubrication branched oil passage 53 in order to supply oil discharged from the second hydraulic pump 22 to the lubrication branched oil passage 53. In the configuration according to the embodiment, the branched oil passage 45 is connected to the first lubrication oil passage 61, which is provided downstream of the orifice 91, or the second lubrication oil passage 62, which is provided downstream of the orifice 97, not via the lubrication branched oil passage 53. Thus, the discharge pressure required from the second hydraulic pump 22 can be further reduced compared to the configuration according to the first embodiment described above. As a result, the characteristics of the second hydraulic pump 22 that provide a low discharge pressure and secure a high supply flow rate compared to the first hydraulic pump 21 as discussed above can be further exploited with the configuration according to the embodiment.

4. Other Embodiments of Vehicle Drive Device

Figure 7:
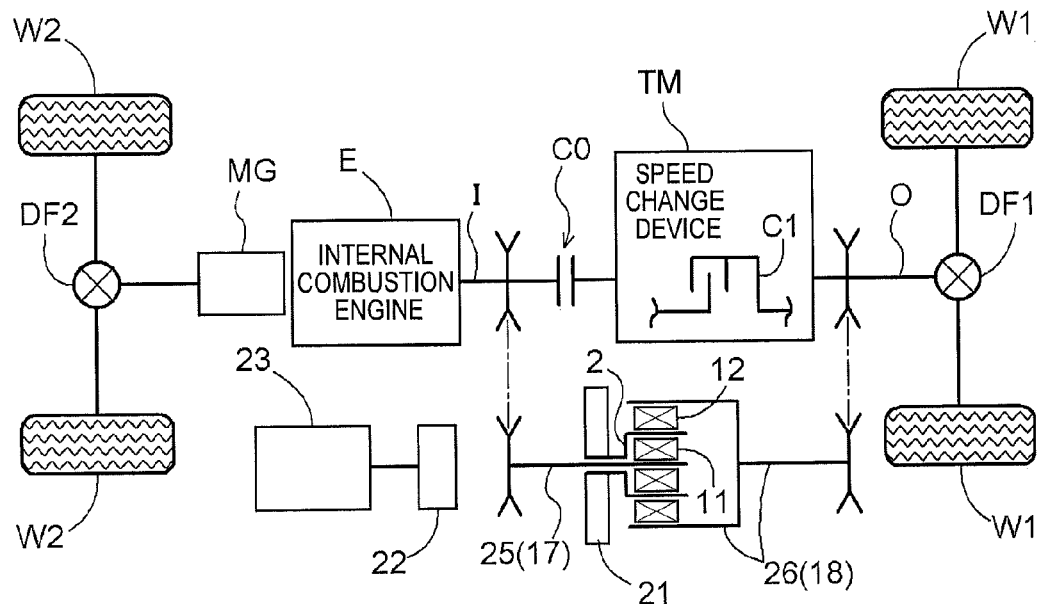
FIG. 7 is a schematic diagram illustrating a schematic configuration (second configuration) of a vehicle drive device according to another embodiment of the present disclosure.
Figure 8:
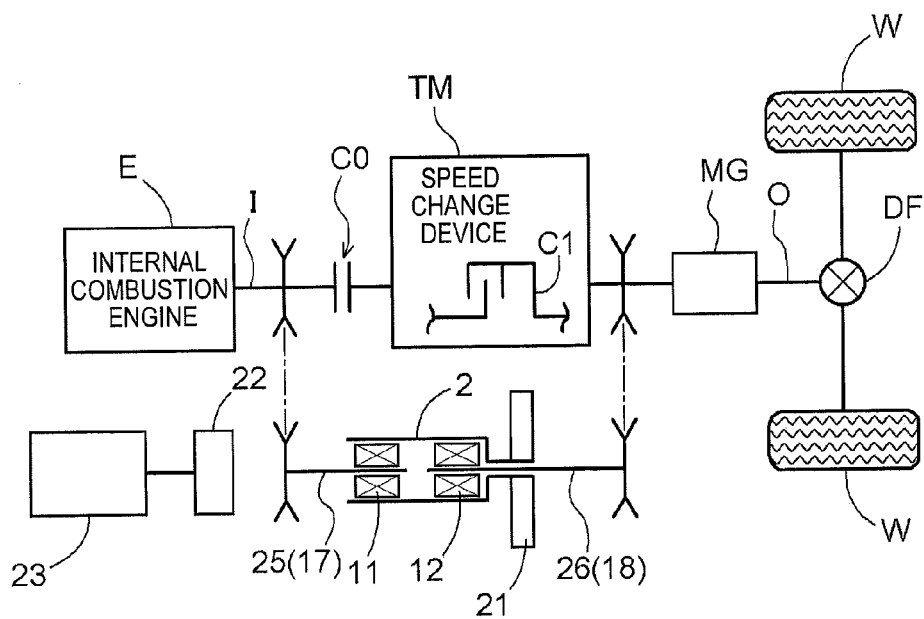
FIG. 8 is a schematic diagram illustrating a schematic configuration (third configuration) of a vehicle drive device according to still another embodiment of the present disclosure.

Next, the configuration of the vehicle drive device 1 to which the oil supply device 10 is applied according to other embodiments of the present disclosure will be described with reference to FIGS. 7 and 8. Here, the configuration of the vehicle drive device 1 illustrated in FIG. 1 discussed above is defined as a first configuration, the configuration illustrated in FIG. 7 is defined as a second configuration, and the configuration illustrated in FIG. 8 is defined as a third configuration.

First, the second configuration of FIG. 7 will be described. In the vehicle drive device 1, unlike the first configuration described above, the rotary electric machine MG for driving wheels is drivably coupled to second wheels W2 that are different from first wheels W1 to which the internal combustion engine E and the speed change device TM are drivably coupled. For example, the internal combustion engine E drives the first wheels W1 (e.g. rear wheels), which are the wheels on one of the front and rear sides of the vehicle, via the speed change device TM, and the rotary electric machine MG drives the second wheels W2 (e.g. front wheels), which are the wheels on the other of the front and rear sides of the vehicle, not via the speed change device TM. Also in the second configuration, the vehicle drive device 1 includes the input shaft I which is drivably coupled to the internal combustion engine E, the rotary electric machine MG for driving wheels, the output shaft O which is drivably coupled to the first wheels W1, the speed change device which includes the shifting engagement device C1 and which transfers rotation of the input shaft I to the output shaft O with the speed of the rotation changed, and the decoupling engagement device C0 which decouples the input shaft I from the speed change device TM. More specifically, in the vehicle drive device 1, the decoupling engagement device C0, the speed change device TM which includes the shifting engagement device C1, the output shaft O, a first differential gear device DF1, and the first wheels W1 are drivably coupled in this order from the side of the input shaft I along a power transfer path from the input shaft I to the first wheels W1. In addition, the rotary electric machine MG is drivably coupled to the second wheels W2 via a second differential gear device DF2. Also in the embodiment, the input shaft I corresponds to the "input member" according to the present disclosure, and the output shaft O corresponds to the "output member" according to the present disclosure.

In addition, the first hydraulic pump 21 is configured to be driven by one of the first interlocking member 17, which operates in conjunction with the input shaft I, and the second interlocking member 18, which operates in conjunction with the rotary electric machine MG, that is rotating at a higher speed. In the second configuration, the first interlocking member 17 is a member coupled to the input shaft I at all times, and the second interlocking member 18 is a member coupled to the output shaft O at all times. Specifically, in the second configuration, the drive shaft of the first hydraulic pump 21 is coupled to the drive member 2 so as to rotate together with the drive shaft. The drive member 2 is drivably coupled to an input drive member 25 via the first one-way clutch 11, and drivably coupled to an output drive member 26 via the second one-way clutch 12. Consequently, the first hydraulic pump 21 is driven by one of the input drive member 25 and the output drive member 26 that is rotating at a higher rotational speed. The input drive member 25 is coupled to the input shaft I via a sprocket and a chain at all times so as to rotate in conjunction with the input shaft I. The output drive member 26 is coupled to the output shaft O via a sprocket and a chain at all times so as to rotate in conjunction with the output shaft O. In a situation in which torque of the rotary electric machine MG is transferred to the second wheels W2 to drive the vehicle with the decoupling engagement device C0 in the disengaged state, torque and rotation of the rotary electric machine MG transferred to the second wheels W2 are transferred to the first wheels W1 via a road surface on which the vehicle is traveling to rotate the output shaft O at a rotational speed that matches the travel speed of the vehicle. Thus, the output drive member 26 operates in conjunction with the rotary electric machine MG via the output shaft O, the first wheels W1, the road surface on which the vehicle is traveling, and the second wheels W2. Hence, in the second configuration, the input drive member 25 corresponds to the "first interlocking member 17" according to the present disclosure, and the output drive member 26 corresponds to the "second interlocking member 18" according to the present disclosure. In FIG. 7, the first hydraulic pump 21 is disposed on an axis that is different from the axes of the input shaft I and the rotary electric machine MG. However, the first hydraulic pump 21 may be disposed coaxially with the input shaft I and the rotary electric machine MG. Also in the second configuration, the second hydraulic pump 22 is a hydraulic pump driven by a drive force source that is different from the drive force source for the first hydraulic pump 21. Specifically, the second hydraulic pump 22 is an electric pump driven by a rotary electric machine (electric motor 23) that serves as the dedicated drive force source.

Next, the third configuration of FIG. 8 will be described. In the vehicle drive device 1, unlike the first configuration described above, the rotary electric machine MG for driving wheels is drivably coupled between the speed change device TM and the wheels W in the power transfer path. Also in the third configuration, the vehicle drive device 1 includes the input shaft I which is drivably coupled to the internal combustion engine E, the rotary electric machine MG for driving wheels, the output shaft O which is drivably coupled to the first wheels W1, the speed change device which includes the shifting engagement device C1 and which transfers rotation of the input shaft I to the output shaft O with the speed of the rotation changed, and the decoupling engagement device C0 which decouples the input shaft I from the speed change device TM. More specifically, in the vehicle drive device 1, the decoupling engagement device C0, the speed change device TM which includes the shifting engagement device C1, the rotary electric machine MG and the output shaft O, the differential gear device DF, and the wheels W are drivably coupled in this order from the side of the input shaft I along a power transfer path from the input shaft I to the wheels W. The rotary electric machine MG is coupled such that the rotor rotates together with the output shaft O. Also in the embodiment, the input shaft I corresponds to the "input member" according to the present disclosure, and the output shaft O corresponds to the "output member" according to the present disclosure.

In addition, the first hydraulic pump 21 is configured to be driven by one of the first interlocking member 17, which operates in conjunction with the input shaft I, and the second interlocking member 18, which operates in conjunction with the rotary electric machine MG, that is rotating at a higher speed. In the third configuration, as in the second configuration described above, the first interlocking member 17 is a member coupled to the input shaft I at all times, and the second interlocking member 18 is a member coupled to the output shaft O at all times. That is, also in the third configuration, the input drive member 25 is coupled to the input shaft I via a sprocket and a chain at all times so as to rotate in conjunction with the input shaft I. The output drive member 26 is coupled to the output shaft O via a sprocket and a chain at all times so as to rotate in conjunction with the output shaft O. In addition, the drive member 2 which rotates together with the drive shaft of the first hydraulic pump 21 is drivably coupled to the input drive member 25 via the first one-way clutch 11, and drivably coupled to the output drive member 26 via the second one-way clutch 12. Consequently, the first hydraulic pump 21 is driven by one of the input drive member 25 and the output drive member 26 that is rotating at a higher rotational speed. In the first configuration and the second configuration described above, the first one-way clutch 11 and the second one-way clutch 12 are disposed so as to overlap each other as seen in the radial direction. In the third configuration, however, such components are disposed side by side in the axial direction. In the third configuration, for example, in a situation in which torque of the rotary electric machine MG is transferred to the wheels W to drive the vehicle with the decoupling engagement device C0 in the disengaged state, torque and rotation of the rotary electric machine MG are transferred to the output shaft O which rotates together with the rotary electric machine MG. Thus, the output drive member 26 operates in conjunction with the output shaft O via a sprocket and a chain. Hence, in the third configuration, the input drive member 25 corresponds to the "first interlocking member 17" according to the present disclosure, and the output drive member 26 corresponds to the "second interlocking member 18" according to the present disclosure. In FIG. 8, the first hydraulic pump 21 is disposed on an axis that is different from the axes of the input shaft I and the rotary electric machine MG. However, the first hydraulic pump 21 may be disposed coaxially with the input shaft I and the rotary electric machine MG. Also in the third configuration, the second hydraulic pump 22 is a hydraulic pump driven by a drive force source that is different from the drive force source for the first hydraulic pump 21. Specifically, the second hydraulic pump 22 is an electric pump driven by a rotary electric machine (electric motor 23) that serves as the dedicated drive force source.

In the second configuration (FIG. 7) and the third configuration (FIG. 8), the rotary electric machine MG is drivably coupled to the wheels W (second wheels W2) not via the speed change device TM. Therefore, in the so-called electric travel mode in which the wheels are driven by output torque of the rotary electric machine MG with the internal combustion engine stationary and the decoupling engagement device C0 controlled to the disengaged state, it is not necessary that the speed change device TM should transfer a drive force in order to transfer output torque of the rotary electric machine MG to the wheels. Therefore, in such configurations, in the electric travel mode, the decoupling engagement device C0 is brought into the disengaged state, the speed change device TM is brought into a neutral state in which no shift speed is established, and thus the shifting engagement device C1 is also brought into the disengaged state. Therefore, it is not necessary to supply a hydraulic pressure to any of the first engagement oil passage 51 which supplies the decoupling engagement device C0 with oil for controlling the state of engagement and the second engagement oil passage 52 which supplies the shifting engagement device C1 with oil for controlling the state of engagement. Thus, in the second configuration and the third configuration, unlike the first configuration described above, oil is supplied to neither the first engagement oil passage 51 nor the second engagement oil passage 52 in the second supply state. Such control is performed by the first supply control valve 55 and the second supply control valve 56 discussed above. In the first supply state, as in the first to third embodiments described above, oil discharged from the first hydraulic pump 21 is supplied to both the first engagement oil passage 51 and the second engagement oil passage 52, and oil discharged from at least the second hydraulic pump 22 is supplied to an oil passage, among the first lubrication oil passage 61 and the second lubrication oil passage 62, that corresponds to an engagement device controlled to the slipping engagement state.

5. Other Embodiments

Lastly, other embodiments of the present disclosure will be described. A configuration disclosed in each of the following embodiments may be applied in combination with a configuration disclosed in any other embodiment unless any contradiction occurs.

(1) In the first embodiment described above, the branched oil passage 45 is connected to the lubrication branched oil passage 53. However, embodiments of the present disclosure are not limited thereto. For example, the branched oil passage 45 may be configured to be connected to the first lubrication oil passage 61 not via the lubrication branched oil passage 53. In this case, the branched control valve portion 84 is configured to control the state of communication between the branched oil passage 45 and the first lubrication oil passage 61.

(2) In the specific example illustrated in FIG. 4 according to the first embodiment described above, the communication state control valve 83 includes two input ports connected to the lubrication branched oil passage 53 and one output port connected to the first lubrication oil passage 61. However, embodiments of the present disclosure are not limited thereto. For example, the communication state control valve 83 may be configured to include one input port connected to the lubrication branched oil passage 53 and two output ports connected to the first lubrication oil passage 61 so that the output port in communication with the one input port is switched between the two output ports between the first switching state and the second switching state. In this case, the flow rate of oil supplied from each output port to the first lubrication oil passage 61 may be set to different values using orifices as in the example illustrated in FIG. 4.

(3) In each of the embodiments described above, the oil supply device 10 is configured to include both the fourth lubrication oil passage 64 and the fifth lubrication oil passage 65. However, embodiments of the present disclosure are not limited thereto. That is, the oil supply device 10 may be configured not to include one or any of the fourth lubrication oil passage 64 and the fifth lubrication oil passage 65.

(4) In both the first embodiment (the examples of FIGS. 2 and 4) and the second embodiment (the example of FIG. 5) described above, only the decoupling engagement device C0 is basically assumed to be brought into the slipping engagement state, and a lubrication oil passage (the first lubrication oil passage 61) is provided for only the decoupling engagement device C0. However, embodiments of the present disclosure are not limited thereto. That is, in the configurations according to the first embodiment and the second embodiment described above, it is also preferable that only the shifting engagement device C1 is basically brought into the slipping engagement state in place of the decoupling engagement device C0, and that a lubrication oil passage is provided for only the shifting engagement device C1.

(5) Also regarding other configurations, the embodiments disclosed herein are illustrative in all respects, and the present disclosure is not limited thereto. That is, a configuration not described in the claims of the present disclosure may be altered without departing from the object of the present disclosure.

INDUSTRIAL APPLICABILITY

The present disclosure may be applied to an oil supply device that supplies oil to a vehicle drive device that includes an input member drivably coupled to an internal combustion engine, a rotary electric machine, an output member drivably coupled to the wheels, a speed change device that transfers rotation of the input member or the rotary electric machine to the output member with the speed of the rotation changed, and a decoupling engagement device that decouples the input member from the rotary electric machine and the speed change device.

The invention claimed is:

1. An oil supply device that supplies oil to a vehicle drive device that includes an input member drivably coupled to an internal combustion engine, a rotary electric machine for driving wheels, an output member drivably coupled to the wheels, a speed change device that includes a shifting engagement device and that at least transfers rotation of the input member to the output member with the speed of the rotation changed, and a decoupling engagement device that decouples the input member from the speed change device, comprising:
- a first hydraulic pump driven by a first interlocking member, which operates in conjunction with the input member, or a second interlocking member, which operates in conjunction with the rotary electric machine;
- a second hydraulic pump driven by a drive force source that is different from a drive force source for the first hydraulic pump;
- a lubrication oil passage that supplies oil for lubrication to at least one of the decoupling engagement device and the shifting engagement device;
- a first engagement oil passage that supplies oil for controlling a state of engagement to the decoupling engagement device;
- a second engagement oil passage that supplies oil for controlling a state of engagement to the shifting engagement device; and
- a supply state control section that controls a state of supply of oil discharged from each of the first hydraulic pump and the second hydraulic pump to each of the oil passages, wherein:
- a state in which oil discharged from the first hydraulic pump is supplied to both the first engagement oil passage and the second engagement oil passage and in which at least oil discharged from the second hydraulic pump is supplied to the lubrication oil passage is defined as a first supply state;
- a state in which oil discharged from the first hydraulic pump is supplied to the second engagement oil passage and in which no oil is supplied to the first engagement oil passage or a state in which oil is supplied to neither the first engagement oil passage nor the second engagement oil passage is defined as a second supply state; and
- the supply state control section establishes the first supply state in the case where rotation of the input member is transferred to the output member with at least one of the decoupling engagement device and the shifting engagement device controlled to a slipping engagement state, and establishes the second supply state in the case where output torque of the rotary electric machine is transferred to the wheels with the decoupling engagement device controlled to a disengaged state.

2. The oil supply device according to claim 1, wherein the supply state control section includes:
- a first check valve provided downstream of a discharge port of the first hydraulic pump;
- a second check valve provided downstream of a discharge port of the second hydraulic pump;
- a merged oil passage connected to both an oil passage provided downstream of the first check valve and an oil passage provided downstream of the second check valve, and connected to both the first engagement oil passage and the second engagement oil passage;
- a branched oil passage that is an oil passage branched from a connection oil passage that connects between the discharge port of the second hydraulic pump and the second check valve;
- a communication state control valve that controls a state of communication between the branched oil passage and the lubrication oil passage; and
- a valve control device that controls a state of the communication state control valve.

3. The oil supply device according to claim 2, wherein:
the supply state control section further includes a lubrication branched oil passage branched from the merged oil passage to be connected to the lubrication oil passage;
the branched oil passage is connected to the lubrication oil passage not via the lubrication branched oil passage; and
the communication state control valve includes a branched control valve portion that controls a state of communication between the branched oil passage and the lubrication oil passage and a lubrication control valve portion that controls a state of communication between the lubrication branched oil passage and the lubrication oil passage.

4. The oil supply device according to claim 3, wherein the branched control valve portion performs control so as to switch between a state in which the branched oil passage and the lubrication oil passage communicate with each other and a state in which the branched oil passage and the lubrication oil passage do not communicate with each other.

5. The oil supply device according to claim 4, wherein the lubrication control valve portion performs control so as to switch a flow rate of oil that flows from the lubrication branched oil passage to the lubrication oil passage between a first flow rate and a second flow rate that is less than the first flow rate.

6. The oil supply device according to claim 3, wherein the lubrication control valve portion performs control so as to switch a flow rate of oil that flows from the lubrication branched oil passage to the lubrication oil passage between a first flow rate and a second flow rate that is less than the first flow rate.

7. The oil supply device according to claim 3, wherein:
the rotary electric machine is drivably coupled between the input member and the speed change device in a power transfer path of the vehicle drive device, the decoupling engagement device is provided between the input member and the rotary electric machine in the power transfer path, the first interlocking member is a member coupled to the input member at all times, and the second interlocking member is a member coupled to the rotary electric machine at all times; or
the rotary electric machine is drivably coupled to the wheels not via the speed change device, the first interlocking member is a member coupled to the input member at all times, and the second interlocking member is a member coupled to the output member at all times.

8. The oil supply device according to claim 2, wherein:
the supply state control section further includes a lubrication branched oil passage branched from the merged oil passage to be connected to the lubrication oil passage;
the branched oil passage is connected to the lubrication branched oil passage; and
the communication state control valve includes a branched control valve portion that controls a state of communication between the branched oil passage and the lubrication branched oil passage.

9. The oil supply device according to claim 8, wherein the communication state control valve further includes a lubrication control valve portion that controls a state of communication between the lubrication branched oil passage and the lubrication oil passage.

10. The oil supply device according to claim 9, wherein the branched control valve portion performs control so as to switch between a state in which the branched oil passage and the lubrication branched oil passage communicate with each other and a state in which the branched oil passage and the lubrication branched oil passage do not communicate with each other.

11. The oil supply device according to claim 9, wherein the lubrication control valve portion performs control so as to switch a flow rate of oil that flows from the lubrication branched oil passage to the lubrication oil passage between a first flow rate and a second flow rate that is less than the first flow rate.

12. The oil supply device according to claim 8, wherein the branched control valve portion performs control so as to switch between a state in which the branched oil passage and the lubrication branched oil passage communicate with each other and a state in which the branched oil passage and the lubrication branched oil passage do not communicate with each other.

13. The oil supply device according to claim 8, wherein:
the rotary electric machine is drivably coupled between the input member and the speed change device in a power transfer path of the vehicle drive device, the decoupling engagement device is provided between the input member and the rotary electric machine in the power transfer path, the first interlocking member is a member coupled to the input member at all times, and the second interlocking member is a member coupled to the rotary electric machine at all times; or
the rotary electric machine is drivably coupled to the wheels not via the speed change device, the first interlocking member is a member coupled to the input member at all times, and the second interlocking member is a member coupled to the output member at all times.

14. The oil supply device according to claim 2, wherein the branched oil passage is connected to the lubrication oil passage not via the oil passage provided downstream of the second check valve.

15. The oil supply device according to claim 14, wherein the communication state control valve performs control so as to switch between a state in which the branched oil passage and the lubrication oil passage communicate with each other and a state in which the branched oil passage and the lubrication oil passage do not communicate with each other.

16. The oil supply device according to claim 14, wherein:
the rotary electric machine is drivably coupled between the input member and the speed change device in a power transfer path of the vehicle drive device, the decoupling engagement device is provided between the input member and the rotary electric machine in the power transfer path, the first interlocking member is a member coupled to the input member at all times, and the second interlocking member is a member coupled to the rotary electric machine at all times; or
the rotary electric machine is drivably coupled to the wheels not via the speed change device, the first interlocking member is a member coupled to the input member at all times, and the second interlocking member is a member coupled to the output member at all times.

17. The oil supply device according to claim 2, wherein:
the rotary electric machine is drivably coupled between the input member and the speed change device in a power transfer path of the vehicle drive device, the decoupling engagement device is provided between the input member and the rotary electric machine in the power transfer path, the first interlocking member is a member coupled to the input member at all times, and the second interlocking member is a member coupled to the rotary electric machine at all times; or
the rotary electric machine is drivably coupled to the wheels not via the speed change device, the first interlocking member is a member coupled to the input member at all times, and the second interlocking member is a member coupled to the output member at all times.

18. The oil supply device according to claim 1, wherein:
the rotary electric machine is drivably coupled between the input member and the speed change device in a power transfer path of the vehicle drive device, the decoupling engagement device is provided between the input member and the rotary electric machine in the power transfer path, the first interlocking member is a member coupled to the input member at all times, and the second interlocking member is a member coupled to the rotary electric machine at all times; or
the rotary electric machine is drivably coupled to the wheels not via the speed change device, the first interlocking member is a member coupled to the input member at all times, and the second interlocking member is a member coupled to the output member at all times.

19. The oil supply device according to claim 1, wherein:
the first hydraulic pump is driven by the first interlocking member, which operates in conjunction with the input member, or the second interlocking member, which operates in conjunction with the rotary electric machine, that is rotating at a higher rotational speed.

* * * * *